US009361688B2

United States Patent
Chao et al.

(10) Patent No.: US 9,361,688 B2
(45) Date of Patent: Jun. 7, 2016

(54) SENSOR CALIBRATION AND POSITION ESTIMATION BASED ON VANISHING POINT DETERMINATION

(71) Applicant: QUALCOMM Incorporated, San Diego, CA (US)

(72) Inventors: Hui Chao, San Jose, CA (US); Sameera Poduri, Santa Clara, CA (US); Saumitra Mohan Das, Santa Clara, CA (US); Ayman Fawzy Naguib, Cupertino, CA (US); Faraz Mohammad Mirzaei, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/638,943

(22) Filed: Mar. 4, 2015

(65) Prior Publication Data

US 2015/0178924 A1    Jun. 25, 2015

Related U.S. Application Data

(62) Division of application No. 13/671,390, filed on Nov. 7, 2012, now Pat. No. 9,135,705.

(60) Provisional application No. 61/714,508, filed on Oct. 16, 2012.

(51) Int. Cl.
*H04N 17/02* (2006.01)
*G06T 7/00* (2006.01)
(Continued)

(52) U.S. Cl.
CPC ............. *G06T 7/0018* (2013.01); *G06T 7/0042* (2013.01); *H04N 17/002* (2013.01); *H04W 4/027* (2013.01); *G06T 2207/30244* (2013.01)

(58) Field of Classification Search
None
See application file for complete search history.

(56) References Cited

U.S. PATENT DOCUMENTS

| 6,968,094 | B1 | 11/2005 | Gallagher | |
|---|---|---|---|---|
| 8,121,350 | B2 | 2/2012 | Klefenz | |
| 2006/0078214 | A1* | 4/2006 | Gallagher | ............... G06T 5/006 382/254 |

(Continued)

FOREIGN PATENT DOCUMENTS

| CN | 102103747 A | 6/2011 |
|---|---|---|
| JP | 2000182051 A | 6/2000 |
| WO | 2012044308 A1 | 4/2012 |

OTHER PUBLICATIONS

Aguado A. S. et al., "Using Points at Infinity for Parameter Decoupling in Camera Calibration", Transactions on Pattern Analysis and Machine Intelligence, IEEE, Piscataway, USA, Feb. 2005, vol. 27, No. 2, pp. 265-270, XP011124280, ISSN: 0162-8828, DOI: 10.1109/TPAMI.2005.41.

(Continued)

*Primary Examiner* — Twyler Haskins
*Assistant Examiner* — Wesley J Chiu
(74) *Attorney, Agent, or Firm* — Hunter Clark PLLC

(57) ABSTRACT

Disclosed are systems, apparatus, devices, method, computer program products, and other implementations, including a method that includes capturing an image of a scene by an image capturing unit of a device that includes at least one sensor, determining relative device orientation of the device based, at least in part, on determined location of at least one vanishing point in the captured image of the scene, and performing one or more calibration operations for the at least one sensor based, at least in part, on the determined relative device orientation.

22 Claims, 11 Drawing Sheets

(51) Int. Cl.
H04W 4/02 (2009.01)
H04N 17/00 (2006.01)

(56) References Cited

U.S. PATENT DOCUMENTS

| | | | |
|---|---|---|---|
| 2007/0156286 A1* | 7/2007 | Yamauchi | G05D 1/0038 700/245 |
| 2009/0043504 A1* | 2/2009 | Bandyopadhyay | G01C 17/38 701/469 |
| 2010/0189309 A1 | 7/2010 | Rouzes et al. | |
| 2010/0201814 A1* | 8/2010 | Zhang | G06K 9/4647 348/148 |
| 2010/0295948 A1* | 11/2010 | Xie | G06T 7/0018 348/175 |
| 2010/0329513 A1* | 12/2010 | Klefenz | G01C 21/00 382/104 |
| 2011/0081919 A1* | 4/2011 | Das | G01C 21/20 455/456.1 |
| 2011/0115902 A1* | 5/2011 | Jiang | G06T 7/0044 348/135 |
| 2011/0228103 A1 | 9/2011 | Takemoto et al. | |
| 2011/0298602 A1 | 12/2011 | Chen et al. | |
| 2011/0310087 A1* | 12/2011 | Wright, Jr. | G06T 13/80 345/419 |
| 2012/0069019 A1* | 3/2012 | Richards | G06T 7/0061 345/421 |
| 2012/0081512 A1* | 4/2012 | Shimizu | G06K 9/00798 348/36 |
| 2012/0141015 A1* | 6/2012 | Yu | G06T 7/0085 382/154 |
| 2012/0176492 A1 | 7/2012 | Garin | |
| 2013/0238234 A1* | 9/2013 | Chao | G01C 21/206 701/409 |
| 2013/0322767 A1 | 12/2013 | Chao et al. | |
| 2014/0050359 A1* | 2/2014 | Takahashi | G06K 9/4671 382/103 |
| 2014/0104437 A1 | 4/2014 | Chao et al. | |
| 2014/0104445 A1 | 4/2014 | Ramachandran et al. | |
| 2014/0126769 A1 | 5/2014 | Reitmayr et al. | |
| 2014/0141803 A1* | 5/2014 | Marti | H04W 4/043 455/456.2 |
| 2014/0153773 A1* | 6/2014 | Gupta | G06K 9/6202 382/103 |
| 2014/0198227 A1* | 7/2014 | Mohammad Mirzaei | G01C 21/12 348/208.2 |

OTHER PUBLICATIONS

Chen W. et al., "3-D Camera Calibration Using Vanishing Point Concept", Pattern Recognition, Elsevier, GB, Jan. 1991, vol. 24, No. 1, pp. 57-67, XP000168815, ISSN: 0031-3203, DOI: 10.1016/0031-3203(91)90116-M.

Cipolla R. et al., "Camera calibration from vanishing points in images of architectural scenes", Proceedings of the British Machine Vision Conference (BMVC), Sep. 13-19, 1999, University of Nottingham, UK, Sep. 13, 1999, pp. 382-391, XP055084060, Retrieved from the Internet: URL:http://citeseerx.ist.psu.edu/viewdoc/download;jsessionid=22425C149EF630253FDAE29EE9E0D53A?doi=10.1.1.16.946&rep=rep1&type=pdf [retrieved on Oct. 15, 2013].

Dias J. et al., "Vision and inertial sensor cooperation using gravity as a vertical reference", Transactions on Pattern Analysis and Machine Intelligence, IEEE, Piscataway, USA, Dec. 2003, vol. 25, No. 12, pp. 1597-1608, XP011103927, ISSN: 0162-8828, DOI: 10.1109/TPAMI.2003.1251152.

International Preliminary Report on Patentability—PCT/US2013/056127—The International Bureau of WIPO Geneva, Switzerland, Dec. 10, 2014.

International Search Report and Written Opinion—PCT/US2013/056127—ISA/EPO—Nov. 4, 2013.

Kanatani Kenichi et al., "Anatomy of Camera Calibration Using Vanishing Points", IEICE Transactions, Institute of Electronics, Information and Communication Engineers, Tokyo, JP, Oct. 1991, vol. E74, No. 10, pp. 3369-3378, XP000279315, ISSN: 0917-1673.

Kim Zuwhan, "Geometry of Vanishing Points and its Application to External Calibration and Realtime Pose Estimation", Research Report UCB-ITS-RR-2006-5, Jan. 7, 2006, XP055084092, Retrieved from the Internet: URL:http://www.its.berkeley.edu/publications/UCB/2006/RR/UCB-ITS-RR-2006-5.pdf [retrieved on Oct. 15, 2013].

Kosecka et al., "Video Compass," Computer Vision, May 2002, pp. 476-490, Copenhagen, Denmark.

Looney, Mark, "A Simple Calibration for MEMS Gyroscopes," EDN Europe | July 2010, pp. 28-31.

Ruotsalainen, et al., "Heading Change Detection for Indoor Navigation with a Smartphone Camera," International Conference, Indoor Positioning and Indoor Navigation (IPIN), Sep. 2011, pp. 21-23.

Satoh K., et al., "A hybrid registration method for outdoor augmented reality", Augmented Reality, 2001, Proceedings, IEEE and ACM International Symposium on New York, NY, USA, Oct. 29-30, 2001, Los Alamitos, CA, USA, IEEE Computer Society, US, Oct. 29, 2001, pp. 67-76, XP010568049.

Written Opinion of the International Preliminary Examining Authority—PCT/US2013/056127—IPEA/EPO—Sep. 17, 2014.

European Search Report—EP15198687—EPO—Munich, Germany—Mar. 8, 2016, 13 pgs.

* cited by examiner

SENSOR CALIBRATION AND POSITION ESTIMATION BASED ON VANISHING POINT DETERMINATION

CLAIM OF PRIORITY UNDER 35 U.S.C. §119 AND §120

The present Application for Patent is a divisional application of, and claims priority to, U.S. patent application Ser. No. 13/671,390, entitled "SENSOR CALIBRATION AND POSITION ESTIMATION BASED ON VANISHING POINT DETERMINATION," and filed Nov. 7, 2012, which claims the benefit of U.S. Provisional Application Ser. No. 61/714,508, entitled "SENSOR CALIBRATION AND POSITION ESTIMATION BASED ON VANISHING POINT DETERMINATION," and filed Oct. 16, 2012, all of which are assigned to the assignee hereof, and expressly incorporated herein by reference.

BACKGROUND

Information from orientation sensors such as gyroscopes and magnetometers can be used for various applications such as positioning and tracking, activity and gesture identification, and so on. However, gyroscopes require frequent calibration to correct for errors due to factors such as bias, scaling and misalignment. These factors may vary with temperature making a one-time calibration ineffective. A common calibration technique is to detect when the device is at rest and calibrate the sensors. This calibration technique may, however, require a relatively long time to complete. Another sensor, a magnetometer, is sensitive to local magnetic fields, that are common in indoor environments, and can provide incorrect orientation.

SUMMARY

In some variations, a method is disclosed. The method includes capturing an image of a scene by an image capturing unit of a device that includes at least one sensor, determining relative device orientation of the device based, at least in part, on determined location of at least one vanishing point in the captured image of the scene, and performing one or more calibration operations for the at least one sensor based, at least in part, on the determined relative device orientation.

Embodiments of the method may include at least some of the features described in the present disclosure, including one or more of the following features.

Determining the relative device orientation may include determining a rotation matrix relating location coordinates in the image capturing unit's frame of reference and the scene's frame of reference.

Determining the relative device orientation based, at least in part, on the determined location of the at least one vanishing point may include determining the relative device orientation based on determined locations of two or more vanishing points in the captured image of the scene.

The method may further include determining actual device orientation based, at least in part, on the relative device orientation determined from the location of the at least one vanishing point in the captured image of the scene, and further based on a scene orientation value associated with the scene.

The method may further include retrieving the scene orientation value from map data for a region including an area corresponding to the scene in the image captured by the image capturing unit.

The method may further include determining actual device orientation based, at least in part, on the determined relative device orientation, and further based on a previously determined orientation value.

The method may further include determining a change of device orientation based, at least in part, on relative device orientation values determined based, at least in part, on locations of vanishing points determined from a plurality of images captured by the image capturing unit over a period of time.

The at least one sensor may include one or more of, for example, a gyroscope, and/or a magnetometer.

Performing the one or more calibration operations for the at least one sensor may include one of, for example, calibrating the at least one sensor in response to comparison results, produced from a comparison of a measured orientation determined by the at least one sensor and the determined relative device orientation, indicating that the at least one sensor requires calibration, determining that the at least one sensor is calibrated in response to the comparison results indicating that the at least one sensor is calibrated, calibrating a magnetometer, in response to the comparison results indicating that the magnetometer requires calibration, based on an indication of a presence of magnetic interference causing temporary erroneous measurements of the measured orientation, or determining that the magnetometer is calibrated based on the comparison results and further based on the indication of the presence of magnetic interference causing the temporary erroneous measurements of the measured orientation.

Calibrating the at least one sensor may include determining for the at least one sensor, based on the comparison results, one or more of, for example, sensor bias, sensor scaling, or sensor misalignment.

Determining the relative device orientation may include determining deviation of the at least one vanishing point from the center of the captured image for the scene.

In some variations, a device is disclosed. The device includes an image capturing unit, at least one sensor to measure orientation of the device, and a controller. The controller is configured to determine relative device orientation of the device based, at least in part, on determined location of at least one vanishing point in an image of a scene captured by the image capturing unit, and perform one or more calibration operations for the at least one sensor based on the determined relative device orientation.

Embodiments of the device may include at least some of the features described in the present disclosure, including at least some of the features described above in relation to the method, as well as one or more of the following features.

The controller configured to determine the relative device orientation may be configured to determine a rotation matrix relating location coordinates in the image capturing unit's frame of reference and the scene's frame of reference.

The controller configured to determine the relative device orientation based, at least in part, on the determined location of the at least one vanishing point may be configured to determine the relative device orientation based on determined locations of two or more vanishing points in the captured image of the scene.

The controller may further be configured to determine actual device orientation based, at least in part, on the relative device orientation determined from the location of the at least one vanishing point in the captured image of the scene, and further based on a scene orientation value associated with the scene.

The controller may further be configured to determine a change of device orientation based, at least in part, on relative device orientation values determined based, at least in part, on locations of vanishing points determined from a plurality of images captured by the image capturing unit over a period of time.

The controller configured to perform the one or more calibration operations for the at least one sensor may be configured to perform one of, for example, calibrate the at least one sensor in response to comparison results, produced from a comparison of a measured orientation determined by the at least one sensor and the determined relative device orientation, indicating that the at least one sensor requires calibration, determine that the at least one sensor is calibrated in response to the comparison results indicating that the at least one sensor is calibrated, calibrate a magnetometer, in response to the comparison results indicating that the magnetometer requires calibration, based on an indication of a presence of magnetic interference causing temporary erroneous measurements of the measured orientation, or determine that the magnetometer is calibrated based on the comparison results and further based on the indication of the presence of magnetic interference causing the temporary erroneous measurements of the measured orientation.

In some variations, an apparatus is disclosed. The apparatus includes means for capturing an image of a scene for a device that includes at least one sensor, means for determining relative device orientation of the device based, at least in part, on determined location of at least one vanishing point in the captured image of the scene, and means for performing one or more calibration operations for the at least one sensor based, at least in part, on the determined relative device orientation.

Embodiments of the apparatus may include at least some of the features described in the present disclosure, including at least some of the features described above in relation to the method and the device, as well as one or more of the following features.

The means for determining the relative device orientation may include means for determining a rotation matrix relating location coordinates in a frame of reference of the means for capturing the image and the scene's frame of reference.

The means for determining the relative device orientation based, at least in part, on the determined location of the at least one vanishing point may include means for determining the relative device orientation based on determined locations of two or more vanishing points in the captured image of the scene.

The apparatus may further include means for determining actual device orientation based, at least in part, on the relative device orientation determined from the location of the at least one vanishing point in the captured image of the scene, and further based on a scene orientation value associated with the scene.

The apparatus may further include means for determining a change of device orientation based, at least in part, on relative device orientation values determined based, at least in part, on locations of vanishing points determined from a plurality of images captured by the means for capturing the image over a period of time.

The means for performing the one or more calibration operations for the at least one sensor may include means for performing one of, for example, calibrating the at least one sensor in response to comparison results, produced from a comparison of a measured orientation determined by the at least one sensor and the determined relative device orientation, indicating that the at least one sensor requires calibration, determining that the at least one sensor is calibrated in response to the comparison results indicating that the at least one sensor is calibrated, calibrating a magnetometer, in response to the comparison results indicating that the magnetometer requires calibration, based on an indication of a presence of magnetic interference causing temporary erroneous measurements of the measured orientation, or determining that the magnetometer is calibrated based on the comparison results and further based on the indication of the presence of magnetic interference causing the temporary erroneous measurements of the measured orientation.

In some variations, a non-transitory processor readable media is disclosed. The processor readable media is programmed with a set of instructions executable on a processor that, when executed, cause operations that include capturing an image of a scene by an image capturing unit of a device that includes at least one sensor, determining relative device orientation of the device based, at least in part, on determined location of at least one vanishing point in the captured image of the scene, and performing one or more calibration operations for the at least one sensor based, at least in part, on the determined relative device orientation.

Embodiments of the processor readable media may include at least some of the features described in the present disclosure, including at least some of the features described above in relation to the method, the device, and the apparatus.

In some variations, another method is disclosed. The method includes capturing an image, by an image capturing unit of a device, of a scene associated with a scene orientation value, the device further comprising at least one sensor, determining location of at least one vanishing point in the captured image of the scene, determining a measured device orientation of the device based on one or more measurements performed by the at least one sensor of the device, and determining candidate positions of the device in a region including an area corresponding to the scene based, at least in part, on the location of the at least one vanishing point in the captured image of the scene, the measured device orientation, and orientation data associated with multiple areas within the region.

Embodiments of the method may include at least some of the features described in the present disclosure, including at least some of the features described above in relation to the first method, the device, the apparatus, and the processor readable media, as well as one or more of the following features The method may further include generating an indication to cause the device to be moved, in response to determining that the determined location of the at least one vanishing point in the captured image is at an off-center location, such that a subsequent vanishing point in a subsequent captured image will be located substantially at the center of the subsequent captured image.

Determining the candidate positions may include determining candidate hallways, in an area including multiple hallways associated with respective orientation values, based on relative orientation of the device determined from the location of the at least one vanishing point in the captured image, and based on the measured device orientation.

The method may further include retrieving the orientation data associated with the multiple areas within the region from map data for the region.

In some variations, another device is disclosed. The device includes an image capturing unit, at least one sensor to measure orientation of the device, and a controller. The controller is configured to determine location of at least one vanishing point in an image of a scene captured by the image capturing unit, determine a measured device orientation of the device based on one or more measurements performed by the at least one sensor of the device, and determine candidate positions of the device in a region including an area corresponding to the scene based, at least in part, on the location of the at least one vanishing point in the captured image of the scene, the measured device orientation, and orientation data associated with multiple areas within the region.

Embodiments of the device may include at least some of the features described in the present disclosure, including at least some of the features described above in relation to the methods, the first device, the apparatus, and the processor readable media, as well as one or more of the following features.

The controller may further be configured to generate an indication to cause the device to be moved, in response to determining that the determined location of the at least one vanishing point in the captured image is at an off-center location, such that a subsequent vanishing point in a subsequent captured image will be located substantially at the center of the subsequent captured image.

The controller configured to determine the candidate positions may be configured to determine candidate hallways, in an area including multiple hallways associated with respective orientation values, based on relative orientation of the device determined from the location of the at least one vanishing point in the captured image, and based on the measured device orientation.

The controller may further be configured to retrieve the orientation data associated with the multiple areas within the region from map data for the region.

In some variations, another apparatus is disclosed. The apparatus includes means for capturing an image of a scene for a device that includes at least one sensor, means for determining location of at least one vanishing point in the captured image of the scene, means for determining a measured device orientation of the device based on one or more measurements performed by the at least one sensor of the device, and means for determining candidate positions of the device in a region including an area corresponding to the scene based, at least in part, on the location of the at least one vanishing point in the captured image of the scene, the measured device orientation, and orientation data associated with multiple areas within the region.

Embodiments of the apparatus may include at least some of the features described in the present disclosure, including at least some of the features described above in relation to the methods, the devices, the first apparatus, and the processor readable media, as well as one or more of the following features.

The apparatus may further include means for generating an indication to cause the device to be moved, in response to determining that the determined location of the at least one vanishing point in the captured image is at an off-center location, such that a subsequent vanishing point in a subsequent captured image will be located substantially at the center of the subsequent captured image.

The means for determining the candidate positions may include means for determining candidate hallways, in an area including multiple hallways associated with respective orientation values, based on relative orientation of the device determined from the location of the at least one vanishing point in the captured image, and based on the measured device orientation.

The apparatus may further include means for retrieving the orientation data associated with the multiple areas within the region from map data for the region.

In some variations, a non-transitory processor readable media is disclosed. The processor readable media is programmed with a set of instructions executable on a processor that, when executed, cause operations including capturing an image, by an image capturing unit of a device, of a scene associated with a scene orientation value, the device further comprising at least one sensor, determining location of at least one vanishing point in the captured image of the scene, determining a measured device orientation of the device based on one or more measurements performed by the at least one sensor of the device, and determining candidate positions of the device in a region including an area corresponding to the scene based, at least in part, on the location of the at least one vanishing point in the captured image of the scene, the measured device orientation, and orientation data associated with multiple areas within the region.

Embodiments of the processor readable media may include at least some of the features described in the present disclosure, including at least some of the features described above in relation to the methods, the devices, the apparatus, and the first processor readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Other and further objects, features, aspects, and advantages of the present disclosure will become better understood with the following detailed description of the accompanying drawings.

DETAILED DESCRIPTION

Described herein are systems, apparatus, devices, methods, computer program products and other implementations, including a method that includes capturing an image of a scene by a an image capturing unit (such as a camera) of a device that also includes at least one sensor (e.g., a spatial/orientation/inertial sensor such as a gyroscope, magnetometer, etc.), determining relative device orientation of the device (e.g., represented as a rotation matrix) based, at least in part, on determined location of at least one vanishing point in the captured image of the scene, and performing one or more calibration operations for the at least one sensor based, at least in part, on the determined relative device orientation.

Figure 1:
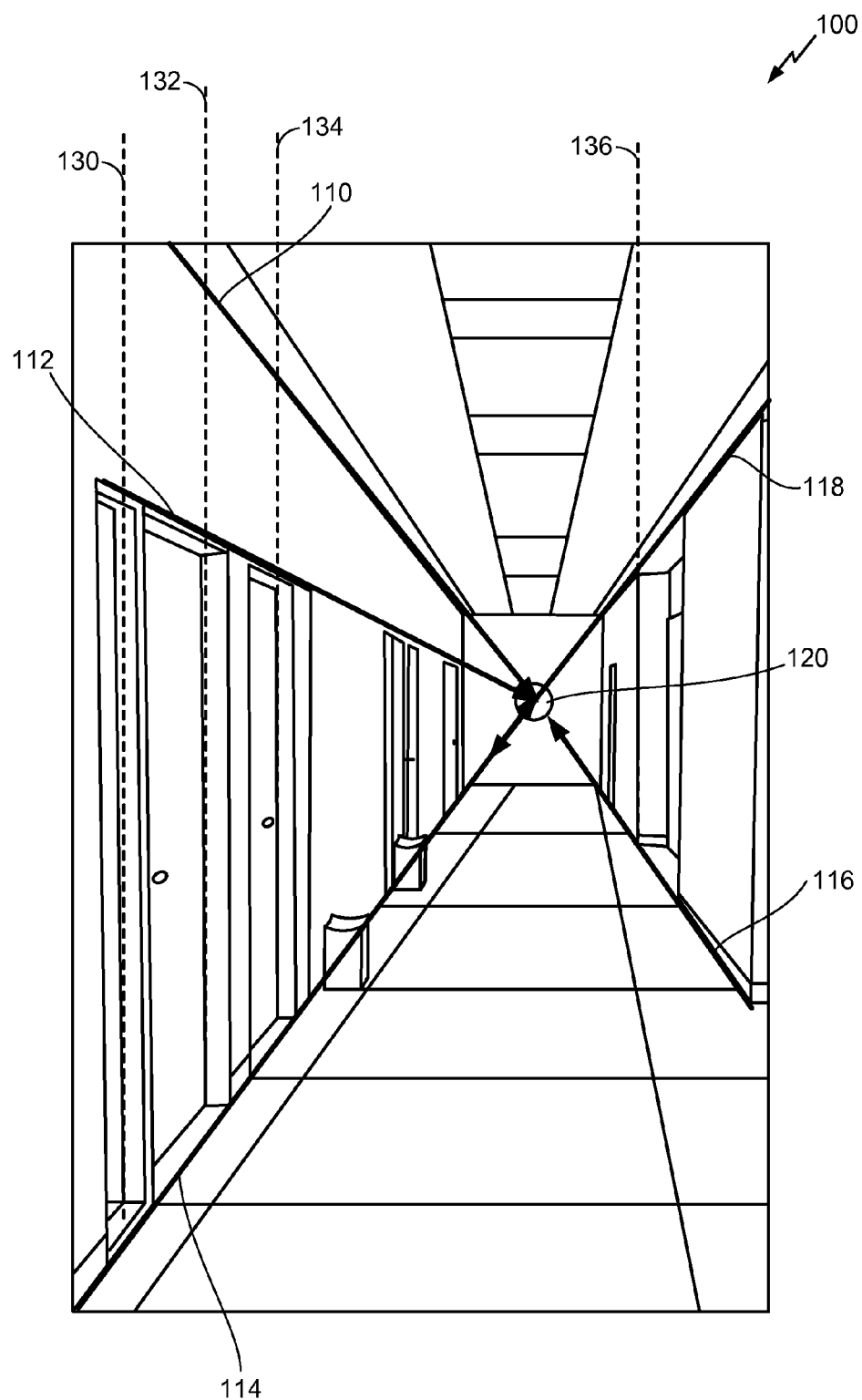
FIG. 1 is a diagram showing convergence of lines to vanishing points in a captured 2-D image of a 3D-scene.

For example, and with reference to FIG. 1, showing convergence of lines 110-118 (which are parallel in a 3-D scene) to a common vanishing point in a corresponding 2-D captured image 100 of the 3D-scene, consider a situation in which a user stands in a hallway whose orientation is known (from a map or from geo-reference information). If the user, standing in the middle of the hallway, points the mobile device's camera approximately along the longitudinal axis of the hallway, a common vanishing point 120 of the edge lines defines the direction of the hallway. Based on the location of the common vanishing point 120, the relative orientation of the camera (e.g., expressed in terms of a rotation matrix that establishes the relationship between the real-world coordinates and the camera coordinate system) may be determined. In some embodiments, when the camera is properly aligned, deviation of the vanishing point from the center of the image can be used to estimate the camera orientation. In some embodiments, at least two vanishing points in the image may be required to determine the relative orientation. If the camera orientation is known, e.g., based on determined relative orientation and/or the known orientation of the hallway or another geographic feature where the user is located, the correctness of independent orientation measurements performed by at least one orientation sensor can be determined by comparing such independent measurements to the determined device orientation. Accordingly, vanishing points in images can be used to calibrate the sensor(s).

Figure 2:
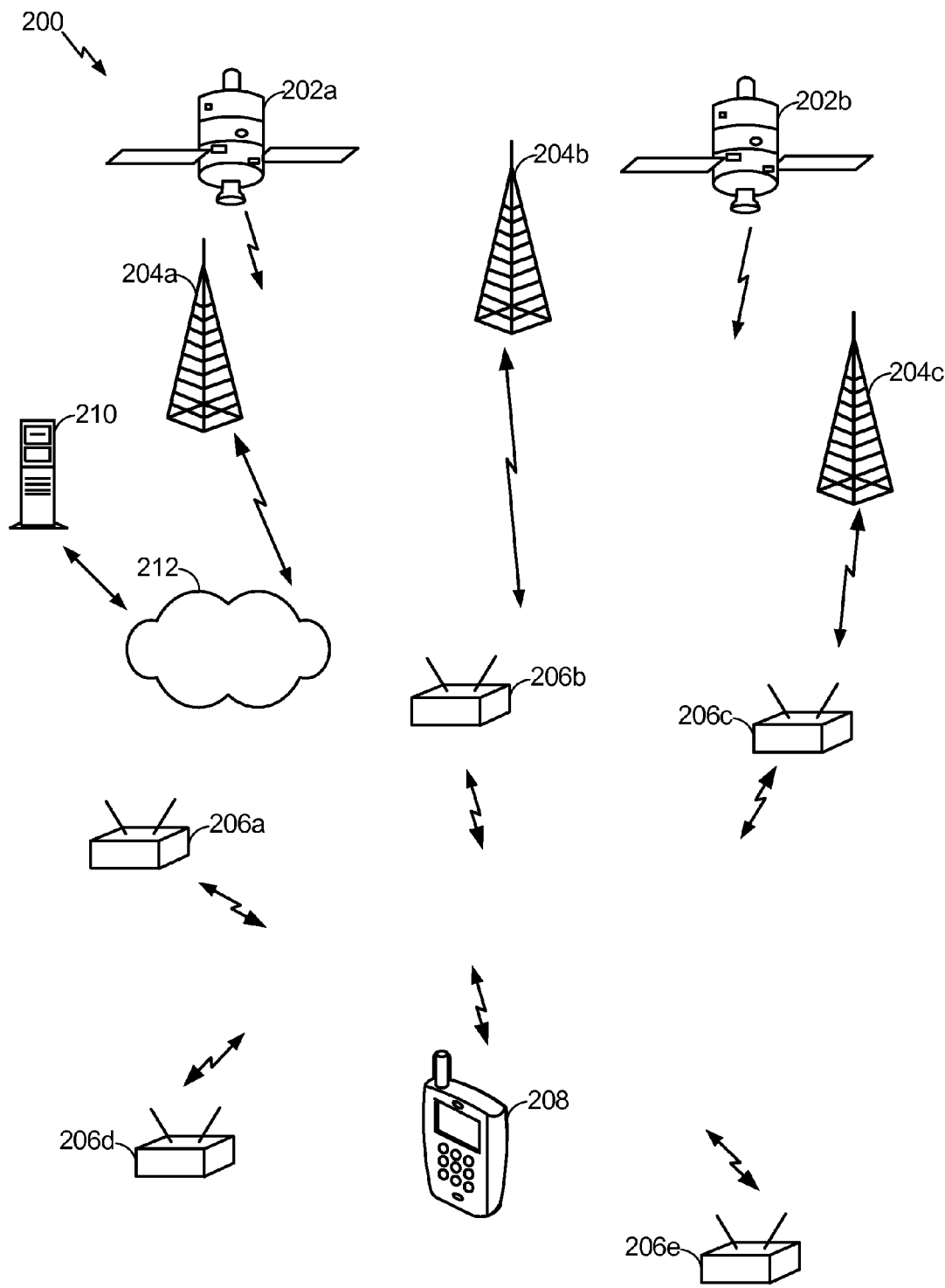
FIG. 2 is a schematic diagram of an example operating environment for a mobile device.

With reference to FIG. 2, a schematic diagram of an example operating environment 200 for a mobile device 208 is shown. The mobile device (also referred to as a wireless device or as a mobile station) 208 may be configured to operate and interact with multiple types of other communication systems/devices, including local area network devices (or nodes), such as WLAN for indoor communication, femtocells, Bluetooth-based transceivers, other types of indoor communication network nodes, wide area wireless network nodes, satellite communication systems, etc., and as such the mobile device 208 may include one or more interfaces to communicate with the various types of communications systems. As used herein, communication system/devices with which the mobile device 208 may communicate are also referred to as access points (AP's). The mobile device is also configured to calibrate one or more orientation sensors (also referred to as spatial or inertial sensors), such as a gyroscope, a magnetometer, etc., by determining its relative orientation based, at least in part, on computation of at least one vanishing point in at least one 2D captured image of a scene. In some variations, an absolute orientation of the device may be determined based on predetermined orientation values provided to the mobile station, e.g., from a server maintaining such values, for certain features of the 3D scene captured by the device's image capturing unit. For example, when the device is located in an indoor environment, predetermined orientation values of hallways in that environment can be used to determine the absolute orientation of the device. As will be described in greater details below, in some embodiments, orientation values can also be determined from a plurality of relative orientations (computed based on vanishing points determination) to enable, for example, determination of a change in orientation undergone by the device 208.

In some variations, the mobile device may further be configured to facilitate location determination of the device based on determination of vanishing points in captured image of the scene visible from the camera of device. Particularly, the mobile device 208 may capture an image (e.g., by its image capturing unit, such as a camera) of a scene associated with a scene orientation value (which may be obtained, for example, from map information stored on the device or obtained from a remote server). The device is configured to determine location of at least one vanishing point in the scene of the captured image, and determine a measured orientation of the device based on measurements performed by an orientation sensor (e.g., gyroscope, magnetometer, etc.) included on the device. Such an orientation sensor(s) is assumed to be calibrated, and thus to provide substantially accurate orientation measures of the mobile device. Candidate positions of the device in a region including an area corresponding to the scene may thus be determined based, at least in part, on the location of the at least one vanishing point in the scene, the measured device orientation, and orientation data associated with multiple areas (such as multiple hallways) within the region.

As noted, the operating environment 200 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 2, the operating environment 200 may include Local Area Network Wireless Access Points (LAN-WAPs) 206a-e that may be used for wireless voice and/or data communication with the mobile device 208. The LAN-WAPs 206a-e may also be utilized, in some embodiments, as independents sources of position data, e.g., through implementation of trilateration-based procedures based, for example, on time of arrival techniques. The LAN-WAPs 206a-e can be part of a Wireless Local Area Network (WLAN), which may operate in buildings and perform communications over smaller geographic regions than a WWAN. Additionally in some embodiments, the LAN-WAPs 206a-e could also be pico or femto cells that are part of a WWAN network. In some embodiments, the LAN-WAPs 206a-e may be part of, for example, WiFi networks (802.11x), cellular piconets and/or femtocells, Bluetooth Networks, etc. The LAN-WAPs 206a-e can also form part of an indoor positioning system. Although five (5) LAN-WAP access points are depicted in FIG. 2, any number of such LAN-WAP's may be used, and, in some embodiments, the operating environment 200 may include no LAN-WAPs access points at all, or may include a single LAN-WAP access point. Furthermore, each of the LAN-WAPs 206a-e depicted in FIG. 2 may be a moveable node, or may be otherwise capable of being relocated.

As further shown in FIG. 2, the operating environment 200 may also include, in some embodiments, a plurality of one or more types Wide Area Network Wireless Access Points (WAN-WAPs) 204a-c, which may be used for wireless voice and/or data communication, and may also serve as another source of independent information through which the mobile device 208 may determine its position/location. The WAN-WAPs 204a-c may be part of wide area wireless network (WWAN), which may include cellular base stations, and/or other wide area wireless systems, such as, for example, WiMAX (e.g., 802.16), femtocell transceivers, etc. A WWAN may include other known network components which are not shown in FIG. 2. Typically, each WAN-WAPs 204a-204c within the WWAN may operate from fixed positions, and provide network coverage over large metropolitan and/or regional areas. Although three (3) WAN-WAPs are depicted in FIG. 2, any number of such WAN-WAPs may be used. In some embodiments, the operating environment 200 may include no WAN-WAPs at all, or may include a single WAN-WAP. Additionally, each of the WAN-WAPs 204a-c depicted in FIG. 2 may be a moveable node, or may otherwise capable of being relocated.

Communication to and from the mobile device 208 (to exchange data, enable position determination of the device 208, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be an IEEE 802.11x network, and a WPAN may be a Bluetooth network, an IEEE 802.15x, or some other type of network. The techniques described herein may also be used for any combination of WWAN, WLAN and/or WPAN.

When deriving position using the WLAN, the mobile device 208 may utilize time of arrival techniques, optionally with the assistance of a positioning server 210 and a network 212. Thus, the mobile device 208 may be configured to determine position information using WAN-WAPs 204a-c which may include WAPs of different types (e.g., cellular base stations, WiMax base stations, etc.) In such an operating environment, the mobile device 208 may be able to use the signals from the different types of WAN-WAP to improve accuracy. The positioning server 210 may communicate with the mobile device 208 through the network 212.

In some embodiments, and as further depicted in FIG. 2, the mobile device 208 may also be configured to at least receive information from a Satellite Positioning System (SPS) 202a-b, which may be used as an independent source of position information for the mobile device 208. The mobile device 208 may thus include one or more dedicated SPS receivers specifically designed to receive signals for deriving geo-location information from the SPS satellites. Thus, in some embodiments, the mobile device 208 may communicate with any one or a combination of the SPS satellites 202a-b, the WAN-WAPs 204a-c, and/or the LAN-WAPs 206a-e. In some variations, each of the aforementioned systems can provide an independent information estimate of the position for the mobile device 208 using different techniques. In some embodiments, the mobile device may combine the solutions derived from each of the different types of access points to improve the accuracy of the position data.

In embodiments in which the mobile device 208 can receive satellite signals, the mobile device may utilize a receiver specifically implemented for use with the SPS that extracts position data from a plurality of signals transmitted by SPS satellites 202a-b. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

As used herein, a mobile device or station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some embodiments, the procedures described herein, including procedures to determine vanishing points, calibrate sensors based on determined vanishing points, etc., may be performed by devices that do not have wireless functionality (e.g., functionality to wirelessly communicate with other remote devices).

In accordance with certain aspects, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Figure 3:
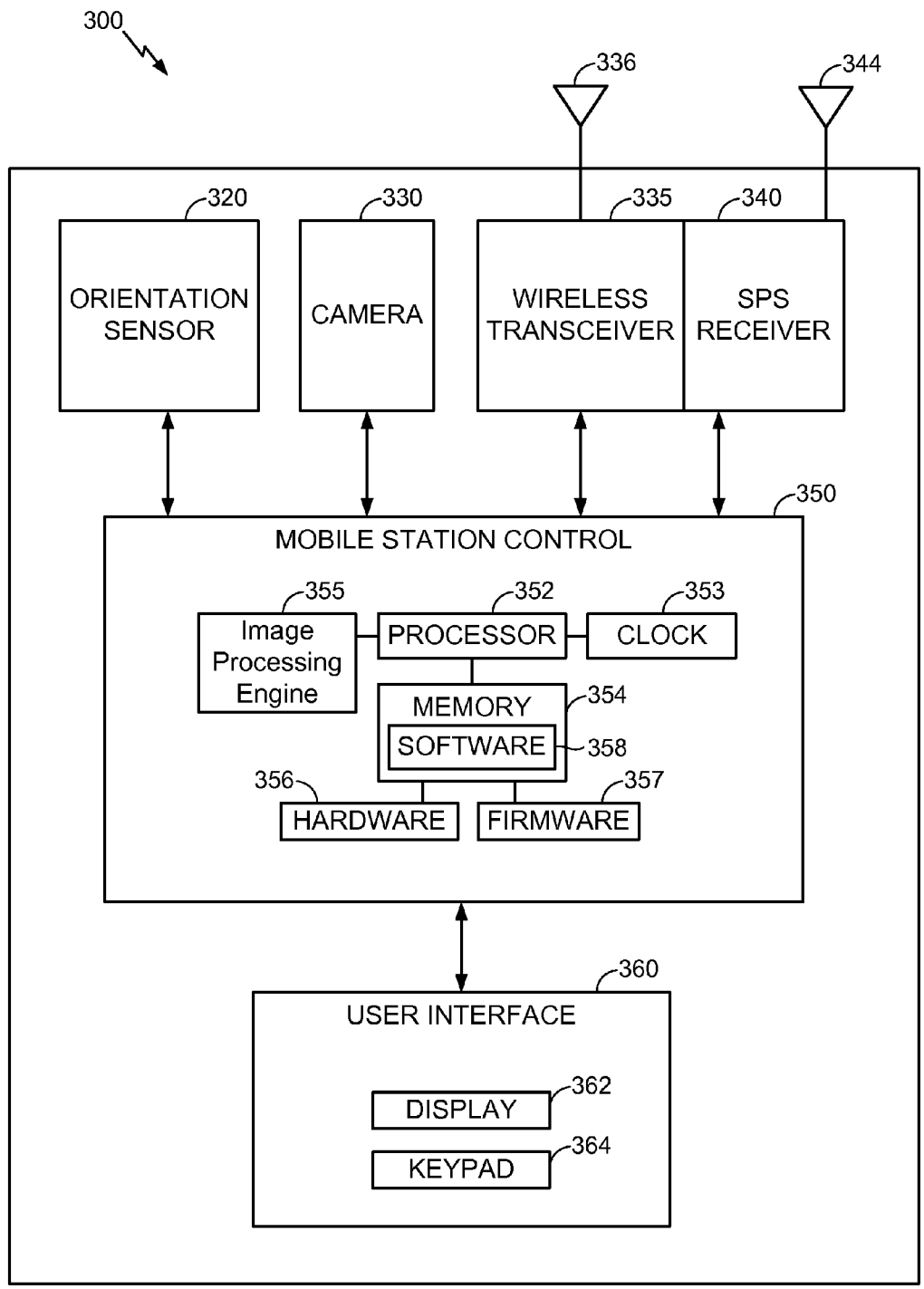
FIG. 3 is a block diagram of a mobile device.

With reference now to FIG. 3, a block diagram of a mobile device 300, which may be similar to the device 208 described in relation to FIG. 2, is shown. As illustrated in FIG. 3, the mobile device 300 may include at least one orientation sensor (also referred to as spatial or inertial sensor) 320, which may be, e.g., a magnetometer, an accelerometer (e.g., a 3D accelerometer), a gyroscopes, etc. Although only one orientation sensor is depicted, additional sensors may be included with the device 300. The mobile station further includes an image capturing device, such as a camera 330 (e.g., a charge-coupled device (CCD)-type camera, CMOS-type camera, etc.), which may produce still or moving images (e.g., a video sequence) that may be displayed on a user interface device, such as a display or a screen.

The mobile device 300 may include a receiver 340, such as a satellite positioning system (SPS) receiver that receives signals from a SPS satellites (such as the satellites 202a-b of FIG. 2) via an antenna 344. The mobile device 300 also includes a wireless transceiver 335, which may be, e.g., a cellular modem or a wireless network radio receiver/transmitter configured to send and receive communications to and from one or more wireless access points (such as any of LAN-WAPs 206a-e and/or the WAN-WAPs 204a-c), or with any other type of network node configured for wireless/cellular communication. Communication to and from the wireless transceiver may be enabled via a dedicated antenna 336, via the antenna 344, or via some other antenna. If desired, the mobile device 300 may include separate transceivers that serve as the cellular modem and the wireless network radio receivers/transmitters.

The at least one orientation sensor 320, the camera 330, the SPS receiver 340, and the wireless transceiver 335 are connected to, and communicate with, a mobile device controller 350. The controller 350 is configured to accept and process data from the at least one orientation sensor 320, the camera 330, the SPS receiver 340, and/or the wireless transceiver 335, and to control the operation of the various on-board units/modules of the device 300, as well as the general operation of the mobile device 300. For example, the controller 350 is configured to process images captured by the camera 330, determine at least one vanishing point(s) (e.g., two or more vanishing points) in the captured image, determine relative orientation of the device 300 based, at least in part, on the determined at least one vanishing point, and/or calibrate the at least one sensor 320 based, at least in part, on the determined relative orientation of the device 300. The controller 350 may include, in some implementations, a processor 352 and associated memory 354, a clock 353, hardware 356, software 358, and firmware 357. The mobile station controller 350 may further include, in some embodiments, a dedicated image processing engine 355, which is illustrated separately from processor 352 for clarity, but which may constitute part of the processor 352. The image processing engine 355 is configured to process images to identify, for example, lines of various features in an image captured by the camera 330 so as to identify/determine vanishing points to which the identified lines converge. Based on the determined vanishing points, the relative orientation of the device 300 (e.g., relative to some geographical feature such as a hallway) may be determined, with which, as will be described in greater details below, orientation sensors fitted on the mobile device 300 may be calibrated.

Figure 4:
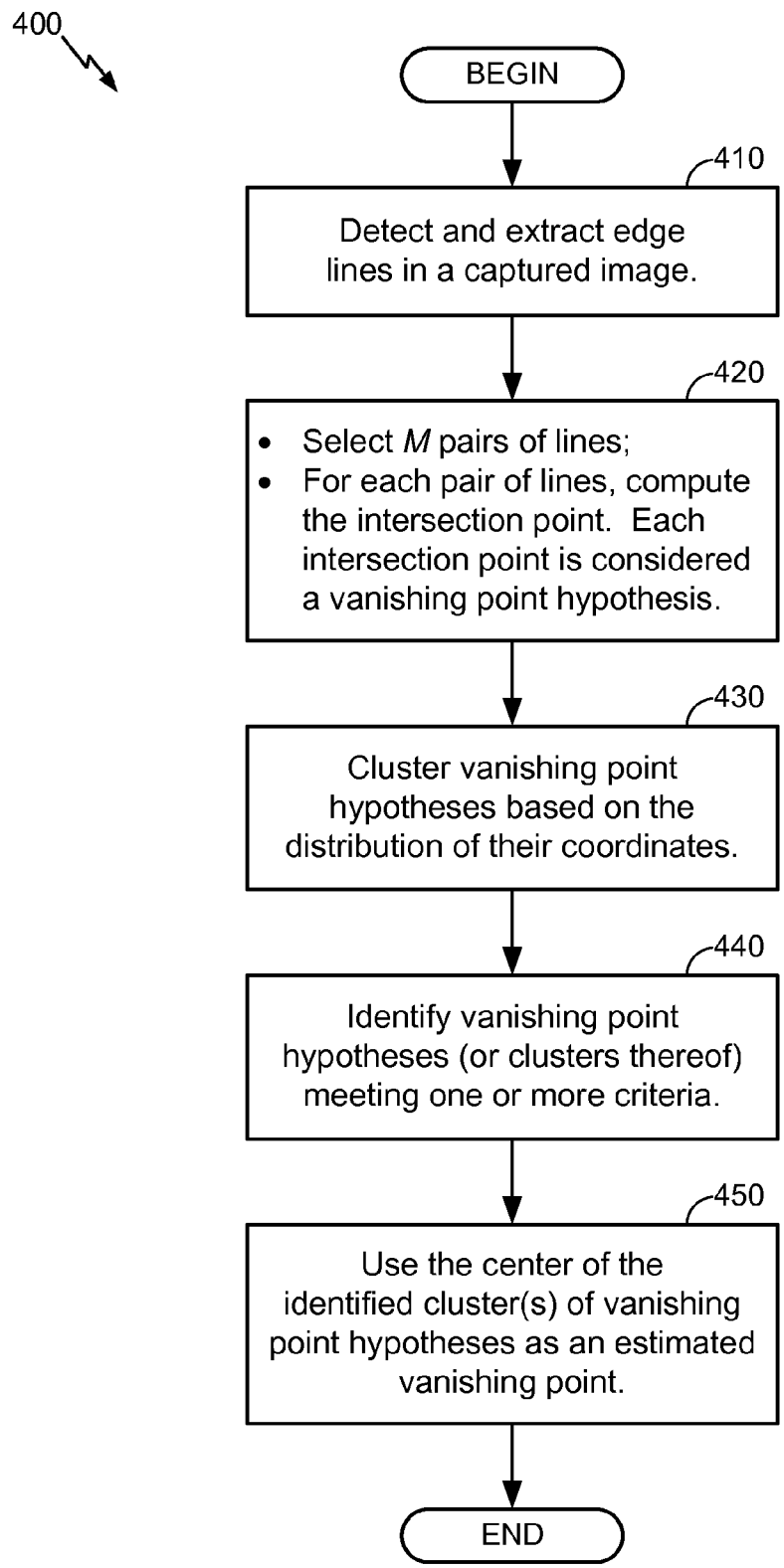
FIG. 4 is a flowchart of an example procedure to determine vanishing points in an image.

Determining vanishing point(s) in an image captured by, for example, the camera 330 of FIG. 3, may be performed based on a procedure such as the one depicted in FIG. 4. An example vanishing point determination procedure 400 illustrated in the flowchart of FIG. 4 includes detecting and extracting 410 edge lines in the image captured, for example, by the camera 330 of the mobile device 300. For example, in some implementations, detecting and extracting edge lines may be performed by applying an edge or line detector operators such as, for example, a convolution kernel (such as Sobel filtering, Canny, Canny-Deriche, Differential, Prewitt, Roberts Cross, or other appropriate operators) to detect edge pixels, which are then connected and fitted into line segments. Other procedures/technique for identifying lines in an image, including procedures based on line fitting techniques such as a Hough transform, may also be used. Examples of line segments extracted from an image include the lines 110-118 and lines 130-136 that were extracted from the image 100 shown in FIG. 1.

Having determined edge lines present in the captured image, a set number M of pairs of lines (where M may be a predetermined number that can be adjusted based on a degree of precision desired for determining vanishing points) is selected 420, and an intersection point for each such pair of lines is determined/computed (also at 420). The intersection point of each of the selected M pair of lines may represent a vanishing point hypothesis. The determined hypotheses of vanishing points are clustered 430 based, for example, on the distribution of the vanishing points' coordinates. In some embodiments (e.g., embodiments in which one vanishing point may be extracted to determine a device's relative orientation), the one or more vanishing points hypotheses that meet one or more criteria are identified 440, and a point that is at (or is approximately at) the center of the identified cluster is deemed/estimated 450 to be the vanishing point of the captured image. The one or more criteria that may be applied to identify vanishing points may include such criteria as the number of points in a cluster of vanishing points (e.g., for a cluster having the largest number of points, one of its points, for example the most central point, can be chosen as the identified vanishing point), the proximity of clusters of vanishing point hypotheses to a certain location, e.g., the center of the image), etc. Other procedures/techniques for identifying vanishing points may also be used. In some embodiments, two or more vanishing points may be selected, one of which may include a vanishing point closest to the center of the image.

Turning back to FIG. 3, the processor 352 may, but need not necessarily include, one or more microprocessors, embedded processors, controllers, application specific integrated circuits (ASICs), digital signal processors (DSPs), and the like. As used herein the term "memory" refers to any type of non-transitory computer storage medium, including long term, short term, or other memory associated with the mobile station, and is not to be limited to any particular type of memory or number of memories, or type of media upon which memory is stored. Further details regarding an example embodiment of a processor or computation system, which may be similar to the processor 352, are provided below in relation to FIG. 9.

The mobile device 300 also includes a user interface 360 that is in communication with the controller 350, e.g., the controller 350 may accept data and control the user interface 360. The user interface 360 includes a display 362 that may display images, including images produced by the camera 330. The display 362 may further display control menus and positional information. The user interface 360 further includes input interface devices, such as, for example, a keypad 364, a touch screen (not shown), a microphone and speaker (not shown), or other input device through which the user can input information into the mobile station 300.

Calibration of Orientation Sensors

As noted, through determination of at least one vanishing point (and generally, two or more vanishing points) in an image captured by a camera of a mobile device (such as the mobile device 300), calibration operations for orientation/motion sensors of the mobile device can be performed. Thus, with reference to FIG. 5, a flowchart of an example procedure 500 for sensor calibration based on determined vanishing points is shown. The procedure 500 includes capturing 510 an image of a scene of a geographical area in which the user of the device is located by an image capturing unit (e.g., a camera such as the camera 330 described in relation to FIG. 3). Capturing the scene may be performed at the discretion of the user carrying the device who may activate the camera, or it may be initiated automatically in response to a determination that one or more on-board orientation sensors of the device need to be calibrated, e.g., based on some predetermined schedule or based on some performance based measurement indicative that the performance of the one or more orientation sensor has degraded to the point that the sensor(s) require calibration. An automatic initiation of the calibration procedure may include sending instructions/directions to the user where the user's help is required for the calibration procedure (e.g., requesting the user to raise the camera and activate it to have an exposure of the scene). In some embodiments, a screen display (such as the display 362 of the device 300 of FIG. 3) may present an image taken with the device's camera (such a camera may be positioned at the side of the device opposite where the display is located) to enable the user to point the camera at the hallway (or at some other salient feature in the scene to aid determination of device orientation). Once the image of the hallway is taken, vanishing points determined in the image may be, in some embodiments, marked/identified in the captured image displayed on the device's display (e.g., superimposing features like a star or a dot at location on the displayed image corresponding to determined vanishing points in that image). In some embodiments, the display of the device may also present a map of the area in which the user is located. For example, a map of the area in which the user is located may occupy a majority of the display surface, while the image captured by the camera may be presented on the remaining area of the display surface (e.g., in a small rectangular area at one corner of the display surface). Alternatively, the image captured by the camera may be presented on a majority of the surface of the display, with the map of the area in which the user is located occupying a smaller portion of the display surface (e.g., at one of the corners of the display surface). In some embodiments, the mobile device may include multiple cameras (e.g., a camera at the back of the device, another camera located on one of its sides, etc.) to thus concomitantly take multiple images of the scene from which multiple vanishing points can be determined Use of multiple cameras included with a single mobile device may enable improved estimation of the camera's orientation relative to the scene in which the image(s) is taken.

Figure 5:
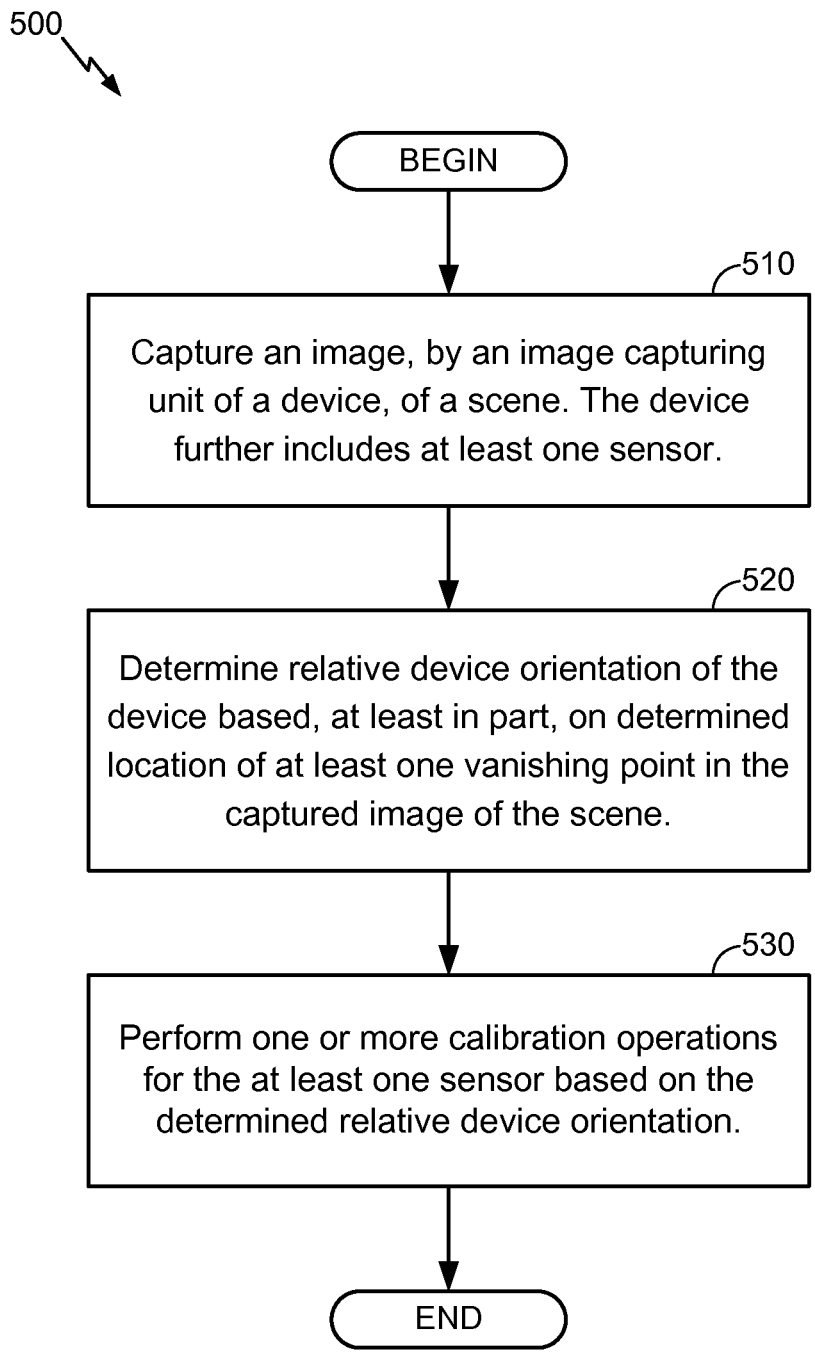
FIG. 5 is a flowchart of an example procedure for sensor calibration based on determined one or more vanishing points.

As further shown in FIG. 5, relative orientation of the device (e.g., the orientation relative to the scene) is determined 520 based, at least in part, on determined location of at least one vanishing point (and generally, at least two) in the captured image of scene. As noted, in some implementations a vanishing point determination procedure, such as the procedure 400 of FIG. 4, may be used to compute a vanishing point in the captured image of the scene. Thus, for example, in such implementations, edge lines in the captured image are detected, clusters of intersection points of multiple pairs of lines are determined, and one or more clusters from those clusters of intersection points is selected (e.g., based on one or more criteria, such as the number of intersection points in a cluster, the proximity of the cluster to the center of the captured image, etc.) Based on the location of the vanishing point(s), the relative orientation of the camera that captured the image of the scene (and thus the relative orientation of the mobile device) is established. For example, and with reference again to FIG. 1, in some embodiments, based on the location of the vanishing point 120, determined from of the intersection of lines 110-118, deviation of the location of the vanishing point 120 from the center of the image enables determination of how the camera is positioned relative to the scene. In the example of FIG. 1, one vanishing point is positioned above and to the right of the center of the image (e.g., at around a 20° angle from the center of the image), and the vertical lines are almost parallel (corresponding to a vanishing point that is at infinity). The computed deviation of the location of the vanishing point from the center of the image indicates that the device's image capturing unit may be rotated slightly in a leftward direction relative to the center of the image. Generally, the relative orientation can be determined from the deviation of a vanishing point from the center of the image when two or more vanishing points are detected.

In some implementations, when two vanishing points are identified in a captured image, a third vanishing point can be estimated based, for example, on determining a vanishing point vector that is orthogonal to the two identified vanishing point, e.g., by performing a cross-product operations on the two vanishing points (which are represented as vectors). Based on the three vanishing points (i.e., the two determined from the captured image, and the third determined, for example, as the cross-product of the first two vanishing points), a rotation matrix is determined from which a rotation angle between the camera's image plane to the world coordinate system can be derived (and thus enable determination of the orientation of the device relative to the scene). For example, the following procedure illustrates the determination of a rotation matrix, R, for a pin-hole camera.

Figure 10A:
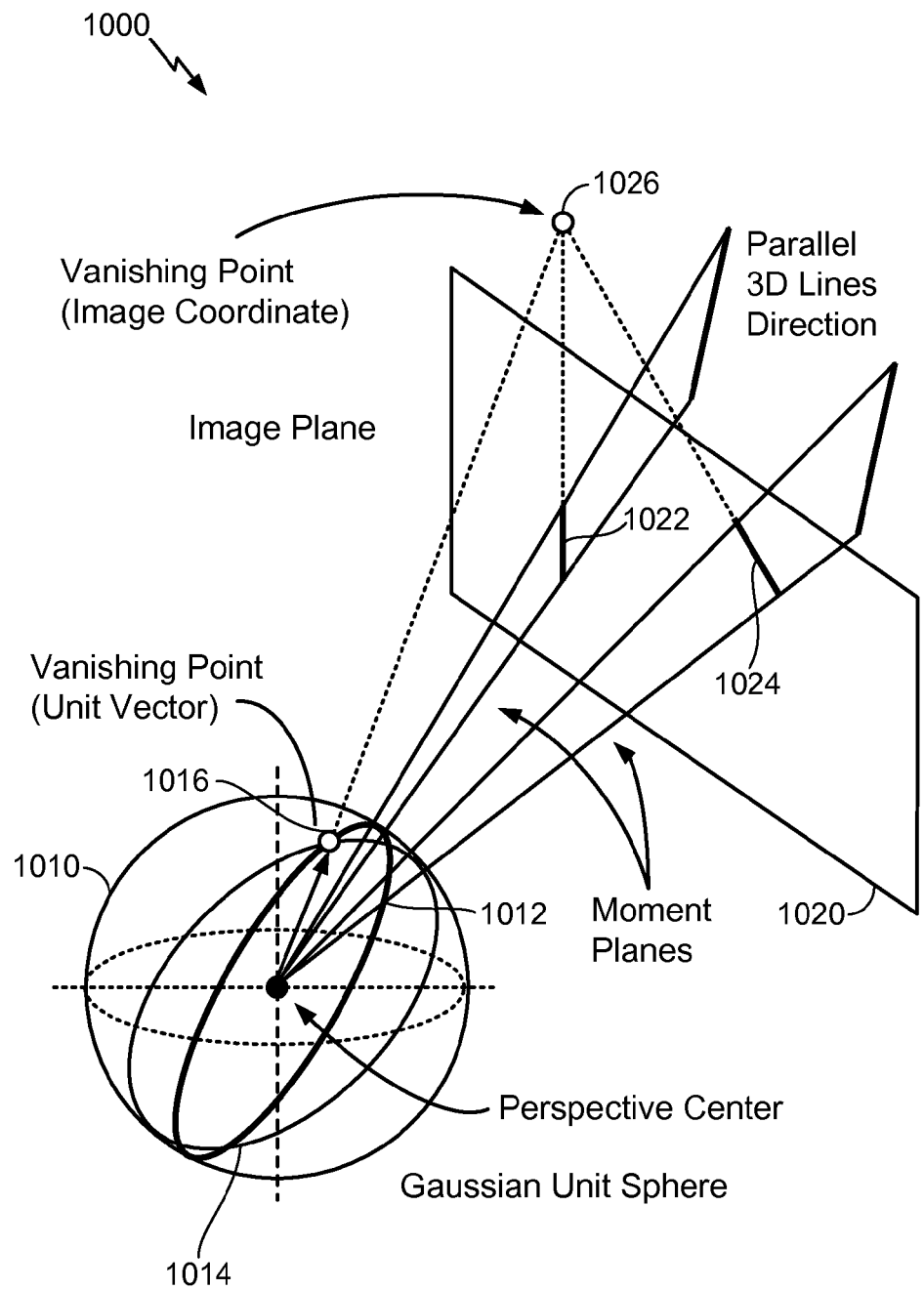
FIG. 10A is a diagram illustrating an example relationship between a unit sphere and lines lying an image plane.

Particularly, when a camera is intrinsically calibrated (e.g., the matrix associated with optical attributes of the camera, such as the camera's focal length and principal points, is known), the line segments in the image can be represented as so-called "Great Circles" that lie on a unit-radius sphere around the camera's perspective center (i.e., line segments appearing in a captured image define great circles as the intersection of the unit sphere with planes passing through the line segments and the perspective center. For example, with reference to FIG. 10A, showing a diagram of the relationship between a unit sphere 1010 and an image plane 1020, a line segment 1022 is associated with a great circle 1012, and a line segment 1024 is associated with a great circle 1014. As further shown in FIG. 10A, the lines 1022 and 1024 intersect at a point 1026. This vanishing point corresponds to a unit vector 1016 on the sphere 1010 (the point 1016 also corresponds to the intersection if the two great circles 1012 and 1014). This unit sphere is commonly referred to as a "Gaussian Sphere." The great circles can be detected by intersecting the Gaussian sphere with the (moment) plane that passes through the line segment and the camera's perspective center.

In situation where line segments extracted from an image are not parallel (e.g., the lines 110-118 of FIG. 1), the line segments intersect each other on the image plane. The (homogeneous) coordinate of this intersection can be represented as $p=[u\ v\ 1]^T$ where u and v are the finite coordinates of the vanishing point on the image plane. The unit length vector of that vanishing point can be determined according to:

$$\overline{p} = \frac{p}{\|p\|}$$

Figure 10B:
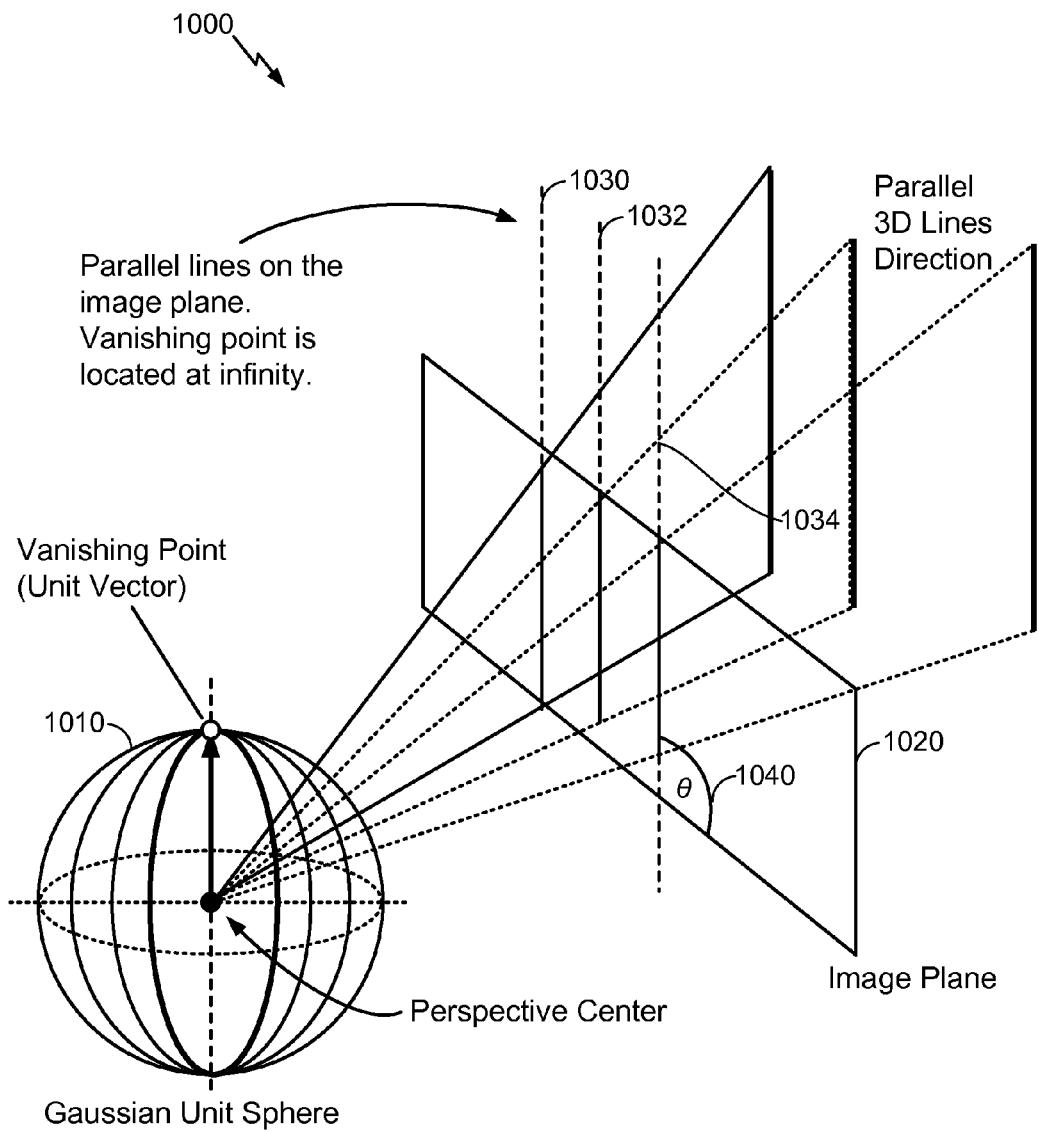
FIG. 10B is a diagram illustrating another example relationship between a unit sphere and lines lying in an image plane.

In situations where 3D parallel lines appear in the 2D image plane as parallel lines (as is the case with lines 1030, 1032, and 1034 depicted in FIG. 10B, or with any of the lines 130, 132, 134, and 136 appearing in the example of FIG. 1), those parallel line segments will not intersect each other on the image plane. In this case the vanishing point is considered to be at infinity. However, the vanishing point on the Gaussian sphere corresponding to image plane vanishing points that are at infinity can be obtained at the intersection of great circles corresponding to those parallel line segments. In that case, the unit vector determined from the intersection of the great circles corresponding to the parallel lines in the image plane extends in a direction that is parallel to direction of the parallel line segments in the image plane. Based on this observation, the unit-norm vector for the vanishing point obtained at the intersection of the great circles corresponding to the parallel 2D line segments (whose corresponding vanishing point is at infinity) can be computed as:

$$\overline{p} = \begin{bmatrix} \cos\theta \\ \sin\theta \\ 0 \end{bmatrix}$$

where θ is an angle 1040 between the horizontal axis on the image plane (1020) and the line 1034.

To determine a rotation matrix, assume a situation where at least two vanishing points are determined from a captured image, be it vanishing points corresponding to line segments in the image that converge to some vanishing point (as is the case for lines corresponding to walls of a hallway), or parallel line segment that do not converge (e.g., vertical lines, such as lines of doors or other structures appearing in the image) and thus correspond to vanishing points that are at infinity. If two vanishing points $p_1$ and $p_2$, corresponding to two principal directions of the surrounding structure (e.g., x and y directions) are detected, the rotation matrix R between coordinate frames of the camera and the surrounding structure can be computed (up to an ambiguity, due to direction assignment) as follows:

$$R=[p_1\ p_2\ p_1 \times p_2]$$

As noted, the term $p_1 \times p_2$ correspond to the cross-product of one of the at least two vanishing point (e.g., $p_1$) with another of the at least two vanishing points (e.g., $p_2$). If the above matrix R is not orthonormal due to inaccuracies of the vanishing point detection, the closet orthonormal matrix can be obtained using QR decomposition. The frame assignment ambiguity occurs, since it may not be known if $p_1$ and $p_2$ correspond to x direction, y direction, or z direction. This ambiguity results in several distinct solutions. The correct solution among these can be easily chosen if there is a rough estimate of the orientation (e.g. from a magnetometer). Otherwise, multiple hypotheses, corresponding to the viable solutions, can be analyzed to select one of those hypotheses.

The resultant rotation matrix R thus represents the relative orientation of the mobile device's camera (i.e., at the particular instance at which the image of the scene was taken). Other ways to compute the relative orientation of the image capturing device (and thus the orientation of the mobile device) from the determined location of at least one vanishing point may also be used.

In some implementations, the relative orientation of a device, as determined, for example, from the vanishing point(s) in the captured image, may not be enough to calibrate orientation sensors so that the sensors can measure actual or absolute orientation (however, in some embodiments, orientation sensors can be configured to provide the orientation relative to an initial orientation of the device so that the sensor can provide the change of orientation of the device when the device's orientation has changed from its initial orientation, e.g., determine rotation matrices of two images when the two images share common detectable features). Accordingly, in such implementations, the actual/absolute orientation of the device may be required to be determined in addition to the relative orientation. For example, in some embodiments, actual orientation may be determined based on the relative device orientation determined from the at least one vanishing point, and further based on a scene orientation value associated with the scene. More particularly, consider, for example, a map 600 illustrated in FIG. 6 which shows a plurality of corridors/hallways in which a user carrying a device, such a as the device 300 of FIG. 3, may be located. Suppose the user, and thus the device, are located at a point marked with an 'X' along the hallway 610 (also marked as hallway 1a). The device's location within the local area corresponding to the map 600 may be derived based on signals communicated from various base stations or access points (e.g., implemented using cellular or WiFi technologies) and received by the wireless transceiver(s) 335 of the device 300. Multilateration position determination procedures may then be performed based on metrics derived from the received signals. Such metrics from which the device's position may be determined include, for example, round trip time (RTT, which generally corresponds to the length of time it takes a signal to be sent from a mobile device to an access point, and to receive from the access point a reply thereto), received signal strength indication (RSSI, which is an indication of a signal power level of a signal received by an antenna of the mobile device), etc. If the device 300 can also receive SPS signals (e.g., by the SPS receiver 340), the position of the device 300 within the local area (such as the one corresponding to the map 600) may be determined based, at least in part, on the SPS signals.

Figure 6:
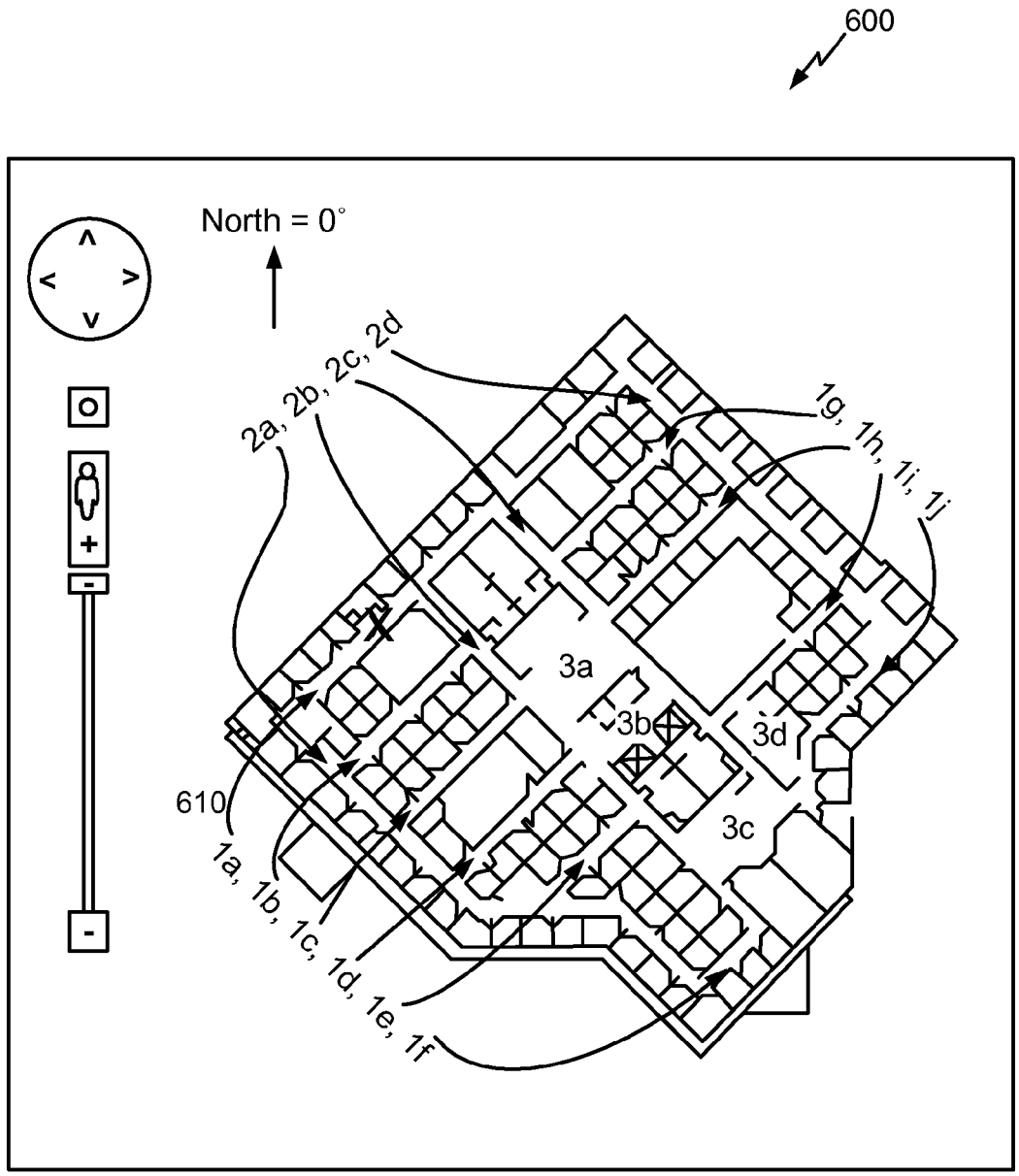
FIG. 6 is a diagram of an example map showing a plurality of corridors/hallways in which a user carrying a device (such as a mobile device) may be located.
Figure 6:
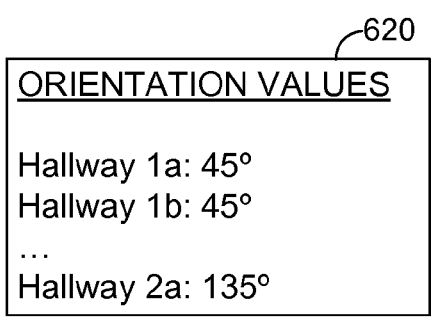

With the device's location thus determined (an approximation of the device's location may be sufficient), a predetermined orientation value associated with geographical features corresponding to the device's location may be obtained. For example, a scene orientation values representative of the configuration/position of the hallway 610 depicted in the map 600 (where the device is determined to be located) relative to some reference point (e.g., absolute north direction, which may be deemed to represent a 0° direction in some embodiments) may be retrieve from map data (arranged using a database or a repository) by, for example, accessing the map data (which may located in a remote server, or stored locally at the device), identifying an entry in the map data corresponding to the determined location (or approximate location) of the device, and reading the orientation value associated with that entry. In the example of FIG. 6, the hallway 1a may be associated with an orientation value of 45° (from the north angular position of the map stored in a database 620). Because the relative orientation of the device (relative to the hallway) has been determined (based on the at least one vanishing point determined from the captured image of the scene of the hallway 610), and the orientation of the hallway 610 has also been determined, the actual orientation of the device can be derived, and thus calibration operation of the device's orientation/motion sensors for which absolute orientation is required may be performed (as will be described in greater details below).

In some implementations, determining orientation of the device (i.e., the device including an image capturing unit and at least one sensor to be calibrated) may be performed based on a change in relative device orientation values determined based, at least in part, on locations of vanishing points determined from a plurality of images captured by the image capturing unit over a period of time. Thus, in such implementations, the image capturing unit of the device (e.g., the camera 330 of the device 300 of FIG. 3) captures a plurality of images of a scene (such as the scene of one of the hallways represented by the map 600 of FIG. 6, or any other scene in which a vanishing point can be identified and its location computed). For at least some of the captured images, respective vanishing points are determined (e.g., in accordance with a procedure similar to the procedure 400 depicted in FIG. 4) to thus derive a plurality of relative orientations for the device. Based on the plurality of the computed relative orientations of the device, the change of the device's orientation is determined. For example, when a user is moving along a straight corridor, a plurality of vanishing points at multiple locations can be detected. By comparing the change in orientation between these time points, the relative orientation of the camera (and thus of the device) can be determined, which in turn enables calibration of the sensor(s). Thus, in situations where it is sufficient to determine the orientation change (i.e., the orientation delta (Δ)), the orientations sensors may be calibrated so that the measured orientation change would be substantially the same as the orientation change determined from the plurality of image and the plurality of vanishing points computed therefrom. For example, assuming that the rotation matrix between the world coordinate system and the first image of, e.g., a hallway, is determined to be $R_0$, and that subsequent rotation matrices from subsequent images are $R_1$, $R_2, \ldots R_n$, the rotation matrix for the $i^{th}$ image and the first image can be computed as $R=R_0*R_1*R_2 \ldots R_i$; and the rotation angles between the $i^{th}$ image and the hallway can then be computed. In the latter equation, R is a 3×3 matrix, the product of any two matrices (e.g., $R_i*R_j$) corresponds to a matrix multiplication operation, and $R_i$ represents the relative rotation between the $i^{th}$ and $(i+1)^{th}$ camera position.

It is to be noted that in situations where the scene is not one of a hallway with parallel walls, different approaches may be taken. For example, when turning left (or right), the current vanishing point may be tracked (e.g., as the device moves to the right, the vanishing point in a sequence of multiple images of the scene may shift to the left). In situations where the scene captured is that of, for example, a T-junction, when the camera gets too close to a wall to see the floor and roof lines, the vanishing point(s) disappears, and a new scene may need to be acquired before further calibration procedure(s) can be performed.

In some implementations, actual device orientation may be determined based, at least in part, on the relative device orientation (computed from the determined at least one vanishing point in the image of the scene), and further based on a previously determined orientation value, e.g., map of the hallway.

Figure 7:
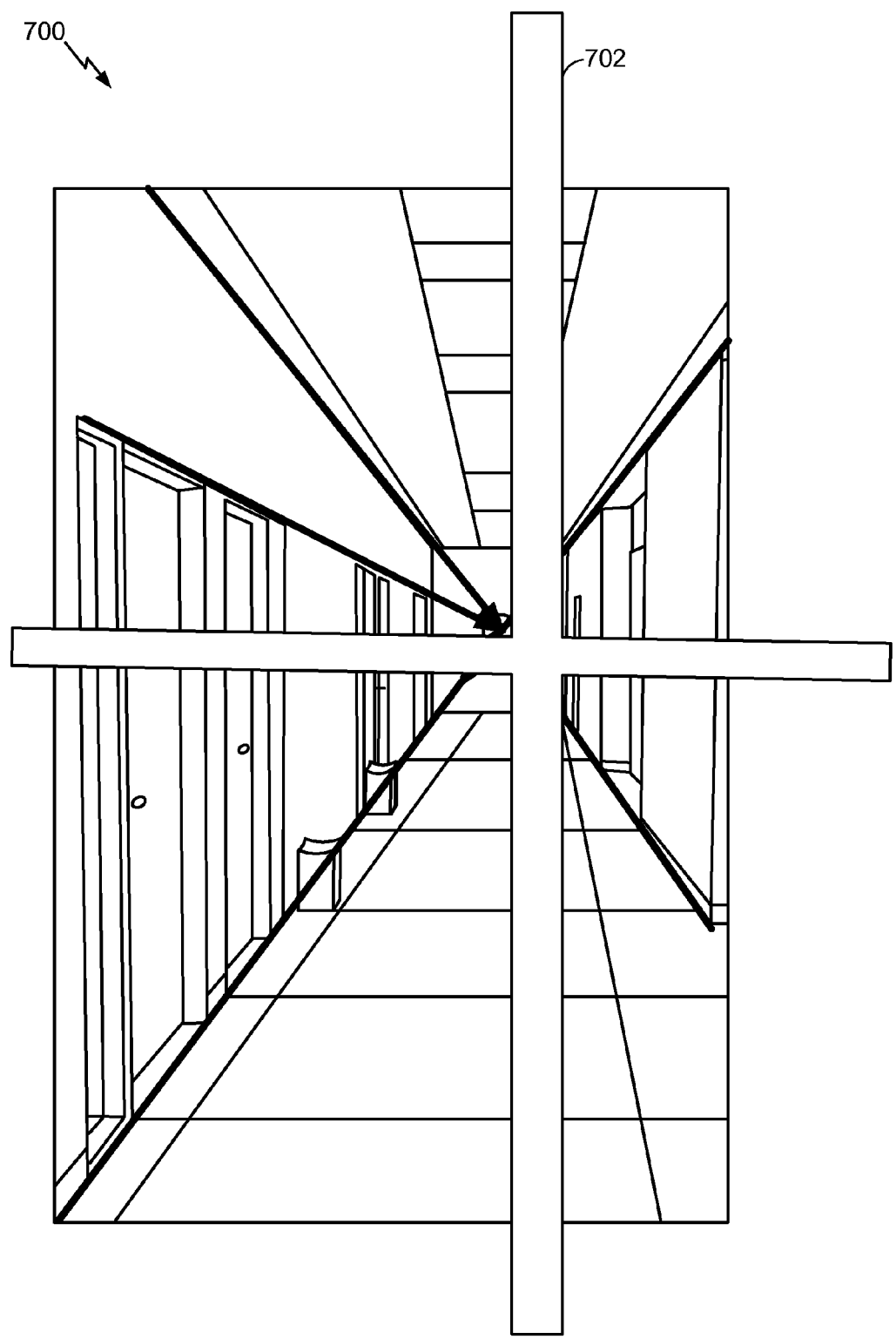
FIG. 7 is an image in which an example of a cross-hair guide is presented to enable the user to align the mobile device it is holding.

In some embodiments, to further improve accuracy of the determination of the vanishing point (e.g., so that the vanishing point in the captured image is substantially at the center of the image), a guide, such as the cross-hair, may be displayed (e.g., superimposed) on the image captured by the image capturing unit to indicate the current location of the computed vanishing point in the captured image. A substantially symmetrical cross-hair display on the image of the captured scene may indicate that the computed vanishing point is substantially at the center of the image. An example of a cross-hair guide 702 appearing in an image 700 of a hallway that may be used to enable the user to align the mobile device it is holding is shown in FIG. 7.

Turning back to FIG. 5, as noted, based on the relative orientation value determined for the device with the image capturing unit, one or more calibration operations for the at least one orientation sensor of the device may be performed 530. In some embodiments, performing such calibration operations may include making a determination as to whether calibration of the device's onboard orientation sensor(s) is necessary. Thus, calibration of the onboard at least one orientation sensor may be deemed necessary in response to comparison results, produced from a comparison of a measured orientation determined by the at least one sensor and the determined relative (or actual/absolute) device orientation, indicating that the sensor requires calibration. For example, when the comparison results are such that the difference between the orientation measured by the orientation sensor(s) and the orientation (relative or actual) determined from vanishing point computations exceeds some predetermined threshold value, calibration may be determined to be necessary. On the other hand, calibration of the at least one orientation sensor may be deemed to be unnecessary in response to the comparison results, produced from the comparison of the measured orientation determined by the at least one sensor and the determined relative device orientation, indicating that the at least one sensor is already calibrated. For example, when the comparison results are such that the difference between the orientation measured by the at least one orientation sensor and the orientation determined from vanishing point computation is less than some predetermined threshold value (which may be different or same as the threshold value used to determine if calibration is necessary), then calibration of the at least one orientation sensor may be determined to be unnecessary.

As noted, in some embodiments, calibration of the device's orientation sensor(s) may be such that the sensor(s) is calibrated to measure relative orientation with respect to the current frame of reference of the area in which the device is currently located. For example, in situations where only the device's relative orientation was derived (e.g., based on computation of at least one vanishing point), the sensor may be calibrated so that orientation measured by that sensor would be relative to the orientation computed based on the at least one vanishing point. For example, if vanishing point computations indicate that the device's image capturing unit is rotated at about 20° in a leftward direction (or counter clockwise direction) relative to the center of the hallway, the device's onboard orientation sensor(s) may likewise be calibrated so as to set their current measured orientation(s) to a value of 20° in a leftward direction relative to the reference point.

When the device's actual orientation is determined (e.g., based on the relative orientation determined from the at least one vanishing point computed from the captured image and from an obtained orientation value associated with the scene corresponding to the captured image), the device's orientation sensor(s) may be calibrated so as to measure actual orientation. Thus, for example, using the device's actual orientation determined based on vanishing point computations (and optionally having determined that calibration of the orientation sensor is necessary, e.g., because of a discrepancy between the orientation measurements currently produced by the orientation sensors and the actual orientation computed based on the vanishing point), the device's orientation sensor(s) may be calibrated so as to, for example, correct one or more of sensor bias, sensor scaling, and/or sensor misalignment for the orientation sensor(s), so that the device's at least one sensor provides orientation measurement that are substantially the same as the orientation value determined based on the vanishing point approach. A sensor's bias (also refers to as the sensor's offset) represents a fixed error (e.g., a fixed erroneous angular rotation value for rotational sensors) reported by the sensor when the actual measurement should be zero. To counter this error, an offset may be added to the sensor's measurements. For example, for rotational orientation sensors (such as a gyroscope or gyrometer), when there is no rotational change, the data representative of the measurement by the rotational sensor should indicate zero angular rotation change. The sensor scaling (sometimes represented as a factor k) represents a measurement discrepancy when there is a change in the attribute measured. For example, in the case of a rotational sensor, a value of k=1 represents no error between actual angular acceleration and the measured angular acceleration. A value of 1.1 represents a 10% difference between the rotational acceleration (or change), as measured by the sensor, relative to the actual rotational acceleration or change. The sensor's Misalignment is the angular variation in the X,Y,Z axes from the orthogonal axes. This occurs due to impreciseness caused when a gyroscope is constructed. Misalignment can be represented as three angles or as a rotation vector.

In some implementation, to correct one or more of sensor bias, sensor scaling, and/or sensor misalignment for the orientation sensor(s), a least-squares optimization technique may be used. The calibration parameters are estimated by minimizing an error function (e.g., the square of difference between the orientation values predicted using a candidate set of calibration parameters and orientation values computed from vanishing points).

As noted, in some embodiments, the calibration procedures based on computed vanishing point(s) may be performed to calibrate, for example, a gyroscope sensor. A gyroscope sensor of the device may be implemented, in some embodiments, based on micro-electro-mechanical-system (MEMS) technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some variations, calibration of the gyroscope of the mobile device may be performed, for example, by comparing the gyroscope-measured orientation with the orientation obtained using the vanishing point approach to compute the bias, scaling, and/or misalignment of the gyroscope. As noted, for some applications the orientation measured by a gyroscope does not need to be an absolute orientation. Rather, for some applications, it may be sufficient to calculate the change in orientation, i.e., the orientation delta (orientation A). Thus, in some embodiments, calibration of a gyroscope may include determining the change in measured orientation by a gyroscope, and comparing that measured change to the change in orientation as determined from the vanishing point approach (i.e., comparing the delta angle detected by both approaches). The change of relative orientation as determined from vanishing point computations can thus enable computation of sensor calibration coefficients and/or correction of some of the gyroscope settings/parameters, e.g., the sensor's scaling factor, the sensor's bias, etc., so that the gyroscope would measure a change of orientation that is consistent (e.g., is substantially the same) as the orientation determined from vanishing point computations. In some embodiments, determination of the bias error and/or scaling-error associated with the gyroscope may be achieved by causing the mobile device to undergo a rotational change, measuring the change in orientation from a plurality of images captured during the rotational change of the gyroscope, and determining from the rotational change (determined from vanishing point computation), and from the output produced by the gyroscope, the offset and scaling values associated with the gyroscope, e.g., by solving for several unknowns, such as the bias error and scaling error, based on multiple measurements using such procedures as linear regression, etc.

In some embodiments, the orientation measuring sensor of the device may be a magnetometer. Magnetometers are configured to measures a magnetic field intensity and/or direction, and may, in some embodiments, measure absolute orientation with respect to the magnetic north, which can be converted to orientation with respect to true north. In some implementations, MEMS-based magnetometer may be used. Such MEMS-base sensors may be configured to detect motion caused by the Lorentz force produced by a current through a MEMS conductor. The resultant motion may then be sensed electronically or optically. Other types of magnetometers, including such magnetometer as, for example, hall effect magnetometers, rotating coil magnetometers, etc., may also be used in implementations of the mobile device in place of, or in addition to, the MEMS-based implementations, Calibration of a magnetometer-type orientation/inertial sensor used in conjunction with the mobile device employing an image capturing unit may be performed in a manner similar to the calibration of a gyroscope-type sensor by, for example, comparing the magnetometer-measured orientation with the orientation obtained using the vanishing point approach to compute the bias, scaling, and/or misalignment of the magnetometer to be calibrated. In some embodiments, the calibration procedure may include providing an absolute orientation measurement by the magnetometer and determining an absolute device orientation based on vanishing point computations from one or more captured images of a scene (e.g., computing the vanishing point in an image, determining the relative orientation of the device, and determining the absolute device orientation based on the determined relative orientation of the device in the scene and based on known direction/orientation values associated with the scene). The difference between the measured orientation of the magnetometer sensor and the device orientation determined from vanishing point(s) may thus enable computation of such parameters as the magnetometer's bias/offset value, its scaling factor, etc. The calibration procedure may require the use of several orientation measurements and several computed vanishing points from one or more images to perform the magnetometer calibration (e.g., in circumstances where calibration of the magnetometer requires computation of multiple calibration coefficients, such as coefficients pertaining to the sensor's offset/bias, scaling, misalignment, etc.)

As with gyroscope-calibration procedures, in some embodiments, calibration of a magnetometer sensor may be performed based on change in the device's orientation (e.g., orientation Δ) without specifically requiring knowledge of absolute orientation of the device. For example, calibration of a magnetometer may include determining the change in measured orientation by the magnetometer, and comparing that measured change to the change in orientation as detected by movement of the vanishing point (i.e., comparing the delta angle detected by both approaches). The change of relative orientation as determined from the vanishing point enables computation of calibration coefficients and/or to correct/adjust some of the sensor's settings/parameters, e.g., the sensor's scaling factor, the sensor's bias, etc., so that the magnetometer would measure a change of orientation that is consistent (e.g., is substantially the same) as the orientation determined from vanishing point computations. In some embodiments, determination of the bias error and/or scaling-error associated with the magnetometer may be achieved by causing the mobile device to undergo a rotational change, measuring the change in orientation from a plurality of images captured during the rotational change of the magnetometer, and determining from the rotational change (determined from vanishing point computations), and from the outputs produced by the magnetometer, the offset and scaling values associated with the gyroscope (e.g., using multiple measurements to solve for multiple coefficients/parameters required for the sensor's calibration).

A common challenge in the use of magnetometer is to account for magnetic anomalies that may cause large errors. Thus, in some embodiments, a vanishing point approach may also be used to detect and correct these errors. For example, because indoor magnetic anomalies are typically caused due to metallic objects and electronic equipment, that usually remain in the same positions, a map of magnetic deviations may be generated which can be used for future reference. It is to be noted that it is possible to operate without a map by using the vanishing point(s) to determine that the orientation has not changed and then calibrating out the periodic anomalies (or other anomalies) caused typically by metal beams. It can even be determined, because the beams are generally uniform, what is the impact of any given beam on the magnetometer and then detect beams as a sensor is approaching them to either: 1) calibrate them out; 2) map them in (e.g., include them as part of a magnetic map); and/or 3) count them or use them as land marks to determine distance and location (because they are typically spaced along a grid or at corners). Thus, calibrating a magnetometer sensor may be based, in part, on knowledge of the existence (and level) of magnetic interference and/or other magnetic anomalies so as to determine the extent to which a discrepancy between orientation values measured by the magnetometer and the device orientation determined based on the vanishing point approach can be attributed to such magnetic interference/anomalies. If the existence and level of the magnetic interference can substantially account for the discrepancy between the orientation measured by the magnetometer and the device orientation computed/derived from vanishing point(s) in the captured image(s), then the magnetometer can be deemed to be calibrated. However, if the discrepancy between the orientation measured by the magnetometer and the device orientation computed from vanishing point(s) cannot be entirely attributed to the existence and level of magnetic interference (as may have been previously computed/determined), then this may be an indication that the magnetometer may require calibration. Accordingly, in some embodiments, performing the calibration procedure for the magnetometer (according to 530 of FIG. 5) may include calibrating a magnetometer in response to comparison results, produced from a comparison of measured orientation determined by the magnetometer and relative device orientation determined from vanishing point(s) computation, indicating, additionally based on an indication of a presence of magnetic interference causing temporary erroneous measurements of the measured orientation, that the magnetometer requires calibration. Performing the calibration procedure for the magnetometer may also include determining that the magnetometer is calibrated based on the comparison results, and further based on the indication of the presence of magnetic interference causing the temporary erroneous measurements of the measured orientation.

Location Estimation

The determination of vanishing points in a captured image of a scene may also be used for location estimation/determination. For example, a user moving within a closed area (e.g., an area which includes multiple hallways/corridors) may be able to obtain an estimate of a possible hallway it may be located in based on orientation information from a mobile device's orientation sensor(s) and identification of a scene's at least one vanishing point.

To determine possible candidate hallways where the user may be located, an image of a scene associated with an orientation value may be captured using the device that includes a camera (such as the camera 330 of the device 300 of FIG. 3) and another independent orientation sensor (e.g., performed by a gyroscope, a magnetometer, or some other sensor corresponding to the sensor 320 depicted in FIG. 3). Location of a vanishing point in the scene in the captured image is determined. Also determined is a measured device orientation from measurements performed by the orientation sensor(s) of the device. Candidate positions of the device in a region including an area corresponding to the scene in the captured image can be determined based, at least in part, on the location of the at least one vanishing point in the scene, the measured device orientation, and orientation data associated with multiple areas within the region.

Consider, for example, a known hallway layout which may be similar to the one depicted in FIG. 6. In this example hallways 1a, 1b, . . . 1j are aligned at an angle of a or a +180°, relative to the North position (which is, for the purpose of this example, set to represent the 0° position), where a is approximately 45° from the North position. Hallway 2a, 2b 2c, and 2d are aligned at approximately 90°+a. When a user stands in a hallway and raises the camera of its device to take a picture of the hallway, the orientation of the device determined by the orientation sensor (with such a sensor assumed to be substantially calibrated) can be used to narrow the device's location to one of several hallways that are associated with the orientation measured by the sensor. Particularly, the relative orientation of the device as determined from vanishing point computations (i.e., the orientation relative to a scene or a feature in the scene, such as the hallway in which the user is standing) may be assumed to be the same as the orientation measured by the sensor relative to the scene or feature. Accordingly, the orientation of the feature relative to a global reference point (such as the position of the North) may be determined from the relative orientation computed based on the vanishing point, and based on the measured orientation provided by the orientation sensor. For example, in a situation where a vanishing point appears substantially at the center of the image, it may be assumed that the orientation measurement provided by the orientation sensor (be it a gyroscope, a magnetometer, and/or some other type of orientation sensor) is a substantially accurate estimate of the orientation of the hallway (relative to a reference point, such as the North position). By comparing this determined orientation estimate to, for example, orientation values associated with the area in which the hallway is located, the location of the device within the area 600 may be narrowed down to several candidate hallways. For example, if the orientation sensor measured an orientation value of 45° (when the vanishing point was substantially at the center of a captured image when that measurement by the orientation sensor was taken), it may be inferred, from the orientation values associated with the area 600, that the mobile device (and thus the user) are located in one of the hallways 1a-1j.

It is to be noted that in situation where no vanishing point is detected, it may be inferred that the user is standing in open spaces such as the spaces 3a-3d shown in FIG. 6. In situations where there is a "low confidence" vanishing point (e.g., due to extraneous lines), and the lines do not converge to 1, 2 or 3 vanishing points, then this situation is equivalent to a case where no vanishing point can be detected, and, therefore, in that situation, approximate location estimation based on the vanishing point approach may not be feasible.

Figure 8:
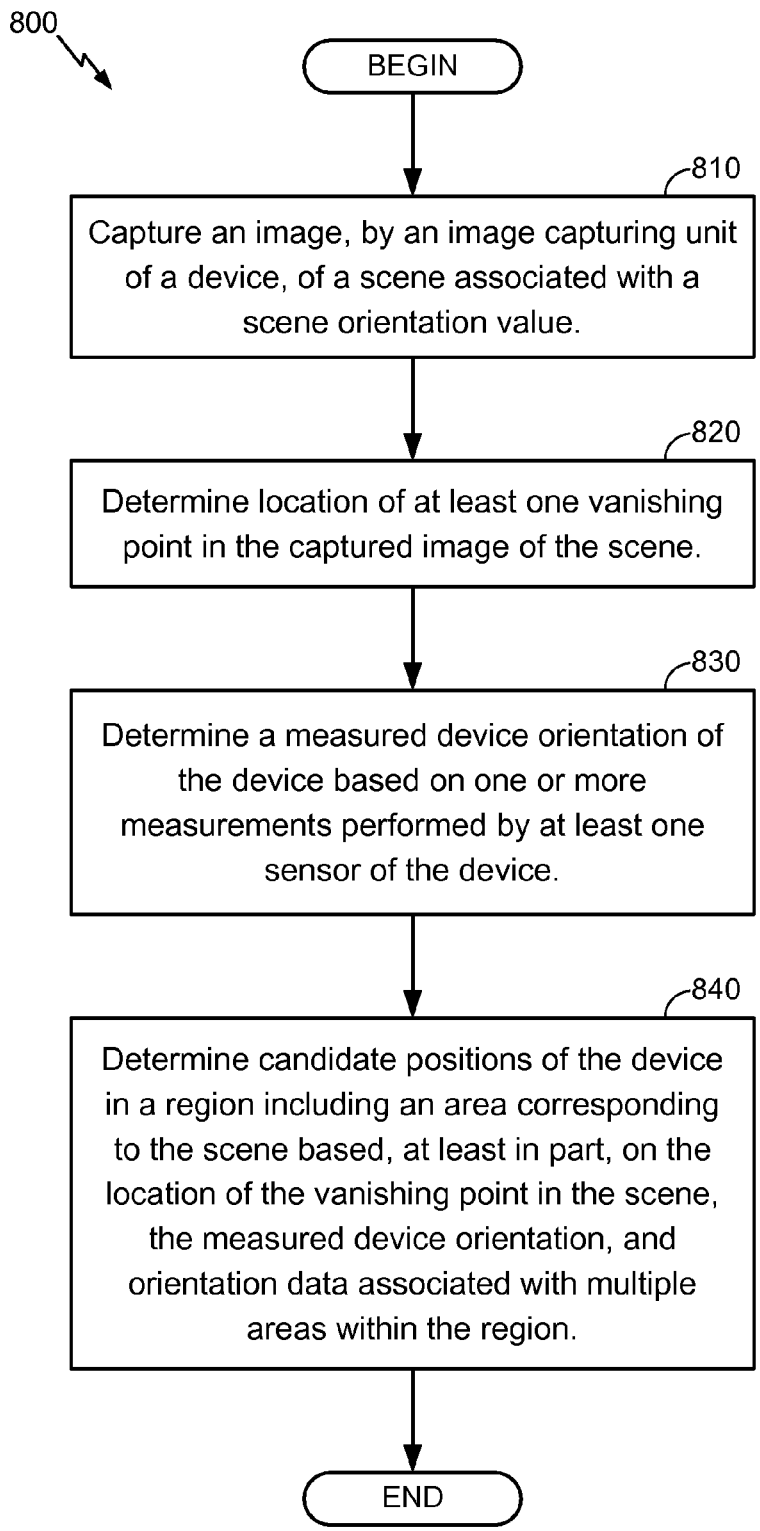
FIG. 8 is a flowchart of an example procedure to estimate location of a mobile device.

Thus, with reference to FIG. 8, a flowchart of a procedure 800 to estimate location of a mobile device is shown. As illustrated, the procedure 800 includes capturing 810 an image, by an image capturing unit (e.g., a CCD camera, a CMOS-camera, etc.) of a device, of a scene associated with a scene orientation value. For example, the user may be prompted to move the device so that the camera is in position to capture an image, and once the camera is in position, the image capturing unit may automatically, or in response to the user pressing a button to cause the image to be taken, capture the image on, for example, a CCD array of a CCD camera, which in turn causes digital data representative of the captured image to be recorded in a storage device (memory or some other media).

The device (e.g., a mobile device) further includes at least one sensor, such as an orientation sensor. From the captured image of the scene, location of at least one vanishing point in the image is determined 820. The location of the at least one vanishing point may be determined based on a procedure such as the procedure 400 described in relation to FIG. 4. In some embodiments, to improve accuracy and reliability of the location estimation procedure and/or to simplify the procedure, a user may be prompted to position the camera of its device so that one of the at least one vanishing point of the image appears substantially at the center of the image. In such embodiments, in response to a determination that the determined location of the vanishing point in the captured image is at an off-center location, an indication may be generated to cause the device to be moved such that a subsequent vanishing point in another captured image will be located substantially at the center of the subsequent captured image.

Additionally, a measured device orientation of the device based on one or more measurements performed by the orientation sensor of the device is determined 830. For example, the sensor may be a MEMS-implemented gyroscope or magnetometer configured to take a measurement representative of an orientation of the sensor (e.g., to measure a change in orientation, measure an orientation relative to some reference point, etc.)

Based, at least in part, on the determined location of the at least one vanishing point in the image of the scene, the measured device orientation, and orientation data associated with multiple areas within the region (such orientation data may be retrieved from map data for the region which may be stored at a remote device or locally at the mobile device), candidate positions of the device in a region including an area corresponding to the scene are determined 840. For example, as noted herein, the location of the at least one vanishing point may be used to determine the relative orientation of the device (represented, for example, as a rotation matrix), e.g., relative to a feature in the scene, such as a hallway. From the relative orientation of the device determined from the at least one vanishing point, the relative orientation of the sensor relative to the same feature can also be determined. For example, if the device is determined to be oriented at about a 10° from the center, the sensor may also be assumed to have the same relative orientation as the device in relation to the reference feature of the captured image (e.g., the hallway), and thus, the orientation of the feature (relative to a reference position such as the North position) may be determined by factoring in the relative orientation of the device determined from the vanishing point into the orientation value obtained through the orientation sensor. That resultant orientation value can then be compared to predetermined orientation values associated with features of the area in the scene (such predetermined values may be stored in a remote server, or locally at the mobile device). Features whose orientation values substantially match the resultant orientation values determined from the orientation sensor measurements and the relative orientations computed based on vanishing points are considered to be possible candidate positions for the device. If only one feature with a matching orientation value is found, that feature (e.g., a hallway) may be deemed to be a feature where the device is currently located.

Figure 9:
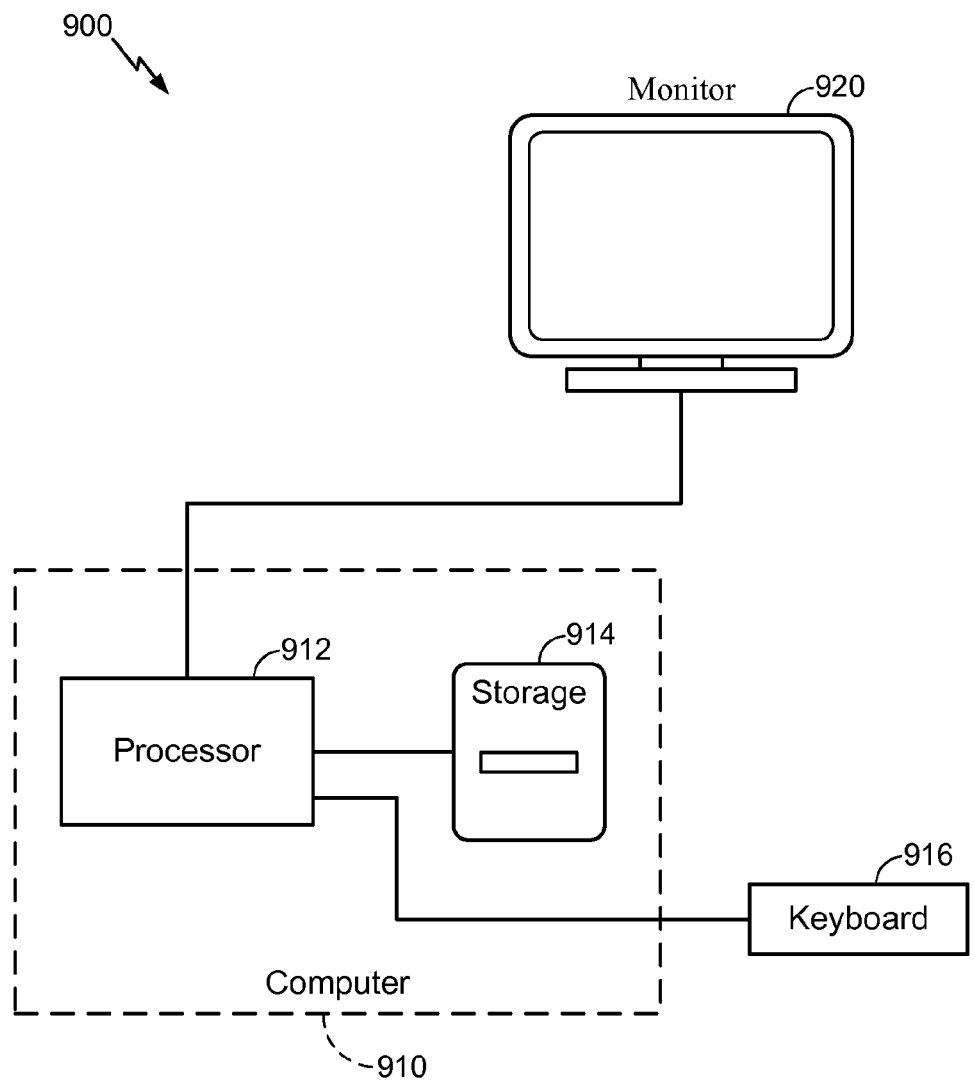
FIG. 9 is a schematic diagram of an example computing system.

Performing the orientation sensor calibration procedures and/or location estimate procedures (e.g., based on vanishing point determination) described herein may be facilitated by a processor-based computing system. With reference to FIG. 9, a schematic diagram of an example computing system 900 is shown. The computing system 900 includes a processor-based device 910 such as a personal computer, a specialized computing device, and so forth, that typically includes a central processor unit 912. In addition to the CPU 912, the system includes main memory, cache memory and bus interface circuits (not shown). The processor-based device 910 may include a mass storage device 914, such as a hard drive and/or a flash drive associated with the computer system. The computing system 900 may further include a keyboard, or keypad, 916, and a monitor 920, e.g., a CRT (cathode ray tube) or LCD (liquid crystal display) monitor, that may be placed where a user can access them (e.g., a mobile device's screen).

The processor-based device 910 is configured to facilitate, for example, the implementation of calibration procedures of orientation sensors (e.g., gyroscope, magnetometer) based on a vanishing point(s) determined in a captured image of a scene, and also to facilitate implementation of location determination procedures based on such vanishing points. The mass storage device 914 may thus include a computer program product that when executed on the processor-based device 910 causes the processor-based device to perform operations to facilitate the implementation of the above-described procedures. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 900. Other modules that may be included with the processor-based device 910 are speakers, a sound card, a pointing device, e.g., a mouse or a trackball, by which the user can provide input to the computing system 900. The processor-based device 910 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method comprising:
   capturing an image of a scene, by an image capturing unit of a device, the device further comprising at least one sensor;
   determining a location of at least one vanishing point in the captured image of the scene;
   determining a measured device orientation of the device based on one or more measurements performed by the at least one sensor of the device; and
   determining candidate positions of the device in a region including an area corresponding to the scene based, at least in part, on the location of the at least one vanishing point in the captured image of the scene, the measured device orientation, and orientation data associated with multiple areas within the region, wherein determining the candidate positions comprises determining candidate areas from the multiple areas within the region based on relative orientation of the device determined from the location of the at least one vanishing point in the captured image, and based on the measured device orientation, and wherein determining the candidate areas comprises determining candidate hallways in the area, with the area including multiple hallways associated with respective orientation values, based on the relative orientation of the device determined from the location of the at least one vanishing point in the captured image, and based on the measured device orientation.

2. The method of claim 1, wherein determining the candidate positions of the device in the region comprises:
   setting the measured device orientation, determined based on the one or more measurements performed by the at least one sensor of the device, as an orientation estimate of the device in response to a determination that the at least one vanishing point is substantially at a center of the image; and identifying candidate areas, from the multiple areas within the region, with associated orientation values substantially matching the orientation estimate of the device.

3. The method of claim 1, further comprising:

in response to determining that the determined location of the at least one vanishing point in the captured image is at an off-center location, generating an indication to prompt a user to move the device so that a subsequent vanishing point in a subsequent captured image will be located substantially at a subsequent image center of the subsequent captured image.

4. The method of claim 1, wherein determining the relative orientation of the device comprises:

determining a rotation matrix relating location coordinates in the image capturing unit's frame of reference and the scene's frame of reference.

5. The method of claim 1, wherein determining the relative orientation of the device based, at least in part, on the determined location of the at least one vanishing point comprises:

determining the relative device orientation based on determined locations of two or more vanishing points in the captured image of the scene.

6. The method of claim 1, further comprising:

computing the candidate hallways' orientation by factoring in the relative orientation of the device, determined from the location of the at least one vanishing point in the captured image, into the measured device orientation determined based on the one or more measurements performed by the at least one sensor.

7. The method of claim 1, further comprising:

retrieving the orientation data associated with the multiple areas within the region from map data for the region.

8. The method of claim 1, wherein the at least one sensor comprises one or more of: a gyroscope, a magnetometer, or an accelerometer, or any combination thereof.

9. The method of claim 1, wherein determining the location of the at least one vanishing point in the captured image comprises:

extracting edge lines in the captured image;

selecting a pre-determined number of pairs of the extracted edge lines;

determining for each of the selected pairs of the extracted edge lines a vanishing point hypothesis corresponding to an intersection point of the respective extracted edge lines;

clustering the each of the determined vanishing point hypothesis into vanishing point clusters; and setting a center point in at least one of the identified vanishing point clusters as the at least one vanishing point.

10. A mobile device comprising:

an image capturing unit to capture an image of a scene;

at least one sensor to measure orientation of the mobile device; and a controller configured to:

determine a location of at least one vanishing point in the image of the scene captured by the image capturing unit;

determine a measured device orientation of the mobile device based on one or more measurements performed by the at least one sensor of the mobile device; and determine candidate positions of the mobile device in a region including an area corresponding to the scene based, at least in part, on the location of the at least one vanishing point in the captured image of the scene, the measured device orientation, and orientation data associated with multiple areas within the region, wherein the controller configured to determine the candidate positions of the mobile device in the region is configured to determine candidate areas from the multiple areas within the region based on relative orientation of the mobile device determined from the location of the at least one vanishing point in the captured image, and based on the measured device orientation, and wherein the controller configured to determine the candidate areas is configured to determine candidate hallways in the area, with the area including multiple hallways associated with respective orientation values, based on the relative orientation of the mobile device determined from the location of the at least one vanishing point in the captured image, and based on the measured device orientation.

11. The mobile device of claim 10, wherein the controller configured to determine the candidate positions of the mobile device in the region is configured to:

set the measured device orientation, determined based on the one or more measurements performed by the at least one sensor of the mobile device, as an orientation estimate of the mobile device in response to a determination that the at least one vanishing point is substantially at a center of the image; and identify candidate areas, from the multiple areas within the region, with associated orientation values substantially matching the orientation estimate of the mobile device.

12. The mobile device of claim 10, wherein the controller is further configured to:

in response to determining that the determined location of the at least one vanishing point in the captured image is at an off-center location, generate an indication to prompt a user to move the mobile device so that a subsequent vanishing point in a subsequent captured image will be located substantially at subsequent image center of the subsequent captured image.

13. The mobile device of claim 10, wherein the controller configured to determine the relative orientation of the mobile device is configured to:

determine a rotation matrix relating location coordinates in the image capturing unit's frame of reference and the scene's frame of reference.

14. The mobile device of claim 10, wherein the controller is further configured to:

retrieve the orientation data associated with the multiple areas within the region from map data for the region.

15. The mobile device of claim 10, wherein the at least one sensor comprises one or more of: a gyroscope, a magnetometer, or an accelerometer, or any combination thereof.

16. An apparatus comprising:

means for capturing an image of a scene for a device that includes at least one sensor;

means for determining a location of at least one vanishing point in the captured image of the scene;

means for determining a measured device orientation of the device based on one or more measurements performed by the at least one sensor of the device; and means for determining candidate positions of the device in a region including an area corresponding to the scene based, at least in part, on the location of the at least one vanishing point in the captured image of the scene, the measured device orientation, and orientation data associated with multiple areas within the region, wherein the means for determining the candidate positions comprises means for determining candidate areas from the multiple areas within the region based on relative orientation of the device determined from the location of the at least one vanishing point in the captured image, and based on the measured device orientation, and wherein the means for determining the candidate areas comprises means for determining candidate hallways in the area, with the area including multiple hallways associated with respective orientation values, based on the relative orientation of the device determined from the location of the at least one vanishing point in the captured image, and based on the measured device orientation.

17. The apparatus of claim 16, wherein the means for determining the candidate positions of the device in the region comprises:

means for setting the measured device orientation, determined based on the one or more measurements performed by the at least one sensor of the device, as an orientation estimate of the device in response to a determination that the at least one vanishing point is substantially at a center of the image; and means for identifying candidate areas, from the multiple areas within the region, with associated orientation values substantially matching the orientation estimate of the device.

18. The apparatus of claim 16, wherein the at least one sensor comprises one or more of: a gyroscope, a magnetometer, or an accelerometer, or any combination thereof.

19. A non-transitory computer readable media programmed with a set of instructions, executable on a processor, to:

capture an image of a scene, by an image capturing unit of a device, the device further comprising at least one sensor;

determine a location of at least one vanishing point in an image of a scene captured by the image capturing unit;

determine a measured device orientation of the device based on one or more measurements performed by the at least one sensor of the device; and determine candidate positions of the device in a region including an area corresponding to the scene based, at least in part, on the location of the at least one vanishing point in the captured image of the scene, the measured device orientation, and orientation data associated with multiple areas within the region, wherein the instructions to determine the candidate positions of the mobile device in the region comprise one or more instructions to determine candidate areas from the multiple areas within the region based on relative orientation of the device determined from the location of the at least one vanishing point in the captured image, and based on the measured device orientation, and wherein the one or more instructions to determine the candidate areas comprise further instructions to determine candidate hallways in the area, with the area including multiple hallways associated with respective orientation values, based on the relative orientation of the device determined from the location of the at least one vanishing point in the captured image, and based on the measured device orientation.

20. The computer readable media of claim 19, wherein the instructions to determine the candidate positions of the device in the region comprise instructions to:

set the measured device orientation, determined based on the one or more measurements performed by the at least one sensor of the device, as an orientation estimate of the device in response to a determination that the at least one vanishing point is substantially at a center of the image; and identify candidate areas, from the multiple areas within the region, with associated orientation values substantially matching the orientation estimate of the device.

21. The computer readable media of claim 19, wherein the set of instructions further comprises instructions to:

retrieve the orientation data associated with the multiple areas within the region from map data for the region.

22. The computer readable media of claim 19, wherein the at least one sensor comprises one or more of: a gyroscope, a magnetometer, or an accelerometer, or any combination thereof.

* * * * *